(12) United States Patent
Varghese

(10) Patent No.: US 8,739,278 B2
(45) Date of Patent: May 27, 2014

(54) TECHNIQUES FOR FRAUD MONITORING AND DETECTION USING APPLICATION FINGERPRINTING

(75) Inventor: Thomas Emmanual Varghese, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1068 days.

(21) Appl. No.: 12/260,544

(22) Filed: Oct. 29, 2008

(65) Prior Publication Data

US 2009/0089869 A1    Apr. 2, 2009

Related U.S. Application Data

(63) Continuation-in-part of application No. 11/412,997, filed on Apr. 28, 2006, now Pat. No. 7,908,645.

(51) Int. Cl.
   *G06F 21/00*    (2013.01)
   *G06F 21/56*    (2013.01)

(52) U.S. Cl.
   CPC .................................. *G06F 21/566* (2013.01)
   USPC .......................................................... 726/22

(58) Field of Classification Search
   None
   See application file for complete search history.

(56) References Cited

U.S. PATENT DOCUMENTS

| | | |
|---|---|---|
| D95,205 S | 4/1935 | Harrison |
| D298,837 S | 12/1988 | Thomas |
| 5,416,895 A | 5/1995 | Anderson et al. |
| 5,428,349 A | 6/1995 | Baker |
| 5,452,413 A | 9/1995 | Blades |
| 5,555,365 A | 9/1996 | Selby et al. |
| 5,559,961 A | 9/1996 | Blonder |
| 5,572,644 A | 11/1996 | Liaw et al. |
| 5,577,125 A | 11/1996 | Salahshour et al. |
| 5,604,854 A | 2/1997 | Glassey |
| 5,623,591 A | 4/1997 | Cseri |

(Continued)

FOREIGN PATENT DOCUMENTS

| | | |
|---|---|---|
| EP | 1 615 181 A1 | 1/2006 |
| EP | 1615181 A1 | 11/2006 |

(Continued)

OTHER PUBLICATIONS

Non-Final Office Action for U.S. Appl. No. 11/340,376 mailed on Aug. 4, 2008; pp. 5.

(Continued)

*Primary Examiner* — David Pearson
(74) *Attorney, Agent, or Firm* — Kilpatrick Townsend & Stockton LLP

(57) ABSTRACT

Techniques for fraud monitoring and detection using application fingerprinting. As used herein, an "application fingerprint" is a signature that uniquely identifies data submitted to a software application. In an embodiment, a plurality of historical application fingerprints are stored for data previously submitted to a software application. Each historical application fingerprint is associated with one or more contexts in which its corresponding data was submitted. When new (i.e., additional) data is subsequently submitted to the application, a new application fingerprint is generated based on the new data, and the new application fingerprint is associated with one or more contexts in which the new data was submitted. The new application fingerprint is then compared with one or more historical application fingerprints that share the same, or substantially similar, context(s). Based on this comparison, a risk score is generated indicating a likelihood that the new data was submitted for a fraudulent/malicious purpose.

21 Claims, 23 Drawing Sheets

(56) References Cited

U.S. PATENT DOCUMENTS

| | | | |
|---|---|---|---|
| 5,664,099 A | 9/1997 | Ozzie et al. | |
| 5,798,760 A | 8/1998 | Vayda et al. | |
| D400,195 S | 10/1998 | Utesch | |
| 5,821,933 A | 10/1998 | Keller et al. | |
| 5,875,296 A | 2/1999 | Shi et al. | |
| 5,928,364 A | 7/1999 | Yamamoto | |
| 5,949,348 A | 9/1999 | Kapp et al. | |
| 5,966,127 A | 10/1999 | Yajima | |
| D419,907 S | 2/2000 | Vogelbruch | |
| 6,023,506 A | 2/2000 | Ote et al. | |
| 6,064,972 A | 5/2000 | Jankowitz et al. | |
| 6,111,984 A | 8/2000 | Fukasawa | |
| 6,209,102 B1 | 3/2001 | Hoover | |
| 6,209,104 B1 | 3/2001 | Jalili | |
| 6,240,183 B1 | 5/2001 | Marchant | |
| 6,253,326 B1 | 6/2001 | Lincke et al. | |
| 6,263,447 B1 | 7/2001 | French et al. | |
| 6,282,551 B1 | 8/2001 | Anderson et al. | |
| 6,343,361 B1 | 1/2002 | Nendell et al. | |
| 6,369,839 B1 | 4/2002 | Peterson | |
| 6,448,987 B1 | 9/2002 | Easty et al. | |
| 6,658,574 B1 | 12/2003 | Anvekar | |
| 6,718,471 B1 | 4/2004 | Kashima | |
| 6,720,860 B1 | 4/2004 | Narayanaswami | |
| 6,725,422 B1 | 4/2004 | Bauchot et al. | |
| 6,741,268 B1 | 5/2004 | Hayakawa | |
| D492,691 S | 7/2004 | Kortis | |
| D493,471 S | 7/2004 | McIntosh | |
| 6,853,973 B2 | 2/2005 | Mathews et al. | |
| D505,135 S | 5/2005 | Sapp et al. | |
| 6,895,502 B1 | 5/2005 | Fraser | |
| 6,895,558 B1 | 5/2005 | Loveland | |
| 6,934,860 B1 | 8/2005 | Goldstein | |
| 6,972,363 B2 | 12/2005 | Georges et al. | |
| 7,007,298 B1 | 2/2006 | Shinzaki et al. | |
| 7,036,091 B1 | 4/2006 | Nguyen | |
| 7,054,819 B1 | 5/2006 | Loveland | |
| 7,082,227 B1 | 7/2006 | Baum et al. | |
| 7,100,049 B2 | 8/2006 | Gasparini et al. | |
| 7,137,008 B1 | 11/2006 | Hamid et al. | |
| D539,809 S | 4/2007 | Totten et al. | |
| 7,200,747 B2 | 4/2007 | Riedel et al. | |
| 7,219,368 B2 | 5/2007 | Juels et al. | |
| 7,237,264 B1* | 6/2007 | Graham et al. | 726/23 |
| 7,240,367 B2 | 7/2007 | Park | |
| 7,437,024 B2 | 10/2008 | Baum et al. | |
| 7,523,067 B1 | 4/2009 | Nakajima | |
| 7,586,635 B2 | 9/2009 | Maeda et al. | |
| 7,596,701 B2 | 9/2009 | Varghese | |
| 7,616,764 B1 | 11/2009 | Varghese | |
| 7,822,990 B2 | 10/2010 | Varghese et al. | |
| 2001/0027529 A1 | 10/2001 | Sasabe et al. | |
| 2002/0013905 A1 | 1/2002 | Hamada | |
| 2002/0029341 A1 | 3/2002 | Juels et al. | |
| 2002/0049614 A1 | 4/2002 | Rice et al. | |
| 2002/0087894 A1 | 7/2002 | Foley et al. | |
| 2002/0122031 A1 | 9/2002 | Maglio et al. | |
| 2002/0188872 A1 | 12/2002 | Willeby | |
| 2003/0005329 A1 | 1/2003 | Ikonen | |
| 2003/0018558 A1 | 1/2003 | Heffner et al. | |
| 2003/0097593 A1 | 5/2003 | Sawa et al. | |
| 2003/0159050 A1 | 8/2003 | Gantman et al. | |
| 2003/0182558 A1 | 9/2003 | Lazzaro et al. | |
| 2003/0210127 A1 | 11/2003 | Anderson | |
| 2004/0010721 A1 | 1/2004 | Kirovski et al. | |
| 2004/0030934 A1 | 2/2004 | Mizoguchi et al. | |
| 2004/0034801 A1 | 2/2004 | Jaeger | |
| 2004/0059951 A1 | 3/2004 | Pinkas et al. | |
| 2004/0073809 A1 | 4/2004 | Wing Keong | |
| 2004/0083389 A1 | 4/2004 | Yoshida | |
| 2004/0117320 A1 | 6/2004 | Morioka et al. | |
| 2004/0128534 A1 | 7/2004 | Walker | |
| 2004/0139353 A1* | 7/2004 | Forcade | 713/201 |
| 2004/0153650 A1* | 8/2004 | Hillmer | 713/176 |
| 2004/0153660 A1 | 8/2004 | Gaither et al. | |
| 2004/0168083 A1 | 8/2004 | Gasparini et al. | |
| 2004/0215980 A1 | 10/2004 | Hamid | |
| 2004/0221163 A1 | 11/2004 | Jorgensen et al. | |
| 2004/0230843 A1 | 11/2004 | Jansen | |
| 2004/0250138 A1 | 12/2004 | Schneider | |
| 2005/0010768 A1 | 1/2005 | Light et al. | |
| 2005/0015601 A1 | 1/2005 | Tabi | |
| 2005/0044425 A1 | 2/2005 | Hypponen | |
| 2005/0097320 A1* | 5/2005 | Golan et al. | 713/166 |
| 2005/0097339 A1* | 5/2005 | Wiley et al. | 713/188 |
| 2005/0144451 A1 | 6/2005 | Voice et al. | |
| 2005/0154676 A1* | 7/2005 | Ronning et al. | 705/44 |
| 2005/0193208 A1 | 9/2005 | Charrette et al. | |
| 2005/0204131 A1 | 9/2005 | Kovarik | |
| 2005/0204145 A1 | 9/2005 | Makishima | |
| 2005/0251752 A1 | 11/2005 | Tan et al. | |
| 2005/0278542 A1 | 12/2005 | Pierson et al. | |
| 2005/0278647 A1 | 12/2005 | Leavitt et al. | |
| 2006/0011045 A1 | 1/2006 | Yamashita et al. | |
| 2006/0020815 A1 | 1/2006 | Varghese et al. | |
| 2006/0104446 A1 | 5/2006 | Varghese et al. | |
| 2006/0212829 A1 | 9/2006 | Yahiro et al. | |
| 2006/0282660 A1 | 12/2006 | Varghese et al. | |
| 2006/0288225 A1 | 12/2006 | Jung et al. | |
| 2007/0028111 A1 | 2/2007 | Covely | |
| 2007/0036314 A1* | 2/2007 | Kloberdans et al. | 379/189 |
| 2007/0097351 A1 | 5/2007 | York et al. | |
| 2007/0165849 A1 | 7/2007 | Varghese et al. | |
| 2007/0169190 A1* | 7/2007 | Kolton et al. | 726/22 |
| 2007/0192615 A1 | 8/2007 | Varghese et al. | |
| 2007/0211925 A1 | 9/2007 | Aoki et al. | |
| 2008/0209526 A1 | 8/2008 | Varghese et al. | |

FOREIGN PATENT DOCUMENTS

| | | |
|---|---|---|
| GB | 2313460 A | 11/1997 |
| JP | 2002-222172 A | 8/2002 |
| JP | 2004258845 A | 9/2004 |
| WO | WO 96/18139 A1 | 6/1996 |
| WO | WO01/18636 A1 | 3/2001 |
| WO | WO0165375 A1 | 9/2001 |
| WO | WO 2004/053674 A2 | 6/2004 |
| WO | WO2005025292 A2 | 3/2005 |
| WO | WO 2006/010058 A2 | 1/2006 |
| WO | WO 2006/118968 A2 | 11/2006 |
| WO | WO 2007/087352 A2 | 8/2007 |

OTHER PUBLICATIONS

Advisory Office Action for U.S. Appl. No. 11/340,376 mailed on May 27, 2008 pp. 3.

Notice of Allowance for U.S. Appl. No. 11/340,376 mailed on Jun. 12, 2009; pp. 12.

Non-Final Office Action for U.S. Appl. No. 11/412,997 mailed on Apr. 10, 2009; pp. 35.

Notice of Allowance for U.S. Appl. No. 11/169,564 mailed on Jun. 1, 2009; pp. 9.

Final Office Action for U.S. Appl. No. 11/318,424 mailed on Jun. 2, 2009; pp. 16.

Supplemental European Search Report for EP Application No. EP05773133 dated Nov. 5, 2010, 4 pages.

Non-Final Office Action for U.S. Appl. No. 11/340,376 mailed on Jul. 27, 2007, 7 pages.

Final Office Action for U.S. Appl. No. 11/340,376 mailed on Mar. 19, 2008, 8 pages.

Non-Final Office Action for U.S. Appl. No. 11/169,564 mailed on Nov. 13, 2008, 8 pages.

International Preliminary Report on Patentability of Aug. 28, 2008 for PCT application No. PCT/US2006/016085.

International Search Report of Apr. 7, 2006 for PCT application No. PCT/US2005/024376.

International Preliminary Report on Patentability of Apr. 13, 2007 for PCT application No. PCT/US2005/024376.

Written Opinion of Apr. 7, 2006 for PCT application No. PCT/US2005/024376.

International Search Report of Jul. 7, 2008 in corresponding international application PCT/US06/16085.

(56) References Cited

OTHER PUBLICATIONS

Written Opinion of Jul. 7, 2008 in corresponding international application PCT/US06/16085.
International Search Report of Feb. 14, 2008 in PCT application No. PCT/US07/01899.
Written Opinion of Feb. 14, 2008 in PCT application No. PCT/US07/01899.
Office Action mailed Sep. 28, 2008 in U.S. Appl. No. 11/412,997.
International Preliminary Report on Patentability of Jan. 2, 2009 in PCT application No. PCT/US07/01899; pp. 10.
US Non-Final Office Action for U.S. Appl. No. 11/340,376, dated Jan. 15, 2009; pp. 9.
US Non-Final Office Action for U.S. Appl. No. 11/318,414, dated Jan. 27, 2009; pp. 8.
Final Office Action for U.S. Appl. No. 11/318,424 mailed on Mar. 10, 2010; 11 pages.
Advisory Action for U.S. Appl. No. 11/318,424 mailed on May 25, 2010, 3 pages.
Final Office Action for U.S. Appl. No. 11/412,997 mailed on May 11, 2010; 22 pages.
"ssh—OpenSSH Ssh client (remote login program)" BSD General Commands Manual, from internet: http://unixhelp.ed.ac.uk/CGl/man-cgi?ssh+1 (Sep. 1999).
Notice of Allowance for U.S. Appl. No. 11/318,424 mailed on Jun. 16, 2010; 7 pages.
Non-Final Office Action for U.S. Appl. No. 11/412,997 mailed on Sep. 13, 2010; 17 pages.
Final Office Action for U.S. Appl. No. 12/001,586 mailed on Oct. 27, 2011, 10 pages.
Non-Final Office Action for U.S. Appl. No. 12/882,096 mailed on Nov. 10, 2011, 9 pages.
Advisory Action for U.S. Appl. No. 12/001,586 mailed on Jan. 6, 2012, 3 pages.
Non-Final Office Action for U.S. Appl. No. 11/318,424 mailed on Sep. 1, 2009; 14 pages.
Non-Final Office Action for U.S. Appl. No. 11/412,997 mailed on Nov. 16, 2009; 19 pages.
Final Office Action for U.S. Appl. No. 12/882,096, mailed on Jun. 21, 2012.
Office Action from China Intellectual Property Office for application CN200780003321.5 (Jun. 18, 2012).
European Examination Report for patent application EP5773133.3 (Apr. 10, 2012 ).
European Examination Report for patent application EP7762565.5 (Jul. 6, 2012).
Final Office Action for U.S. Appl. No. 12/882,096, mailed on Oct. 18, 2012.
European Search Report for application EP06758687.5 (Mar. 14, 2012).
European Search Report for application EP11169063.2 (Mar. 21, 2012).
"ssh—OpenSSH SSH client (remote login program)" BSD General Commands Manual, from internet: http://unixhelp.ed.ac.uk/CGl/man-cgi?ssh+1 (Sep. 1999).
Final Office Action for U.S. Appl. No. 12/001,586 (Mar. 1, 2013).
Non-Final Office Action for U.S. Appl. No. 12/001,586 Oct. 26, 2012).
"How to Set a Wallpaper on the Background of a Folder Window", Microsoft Corporation, Document No. 879735, http://support.microsoft.com/kb/879735/ja (Dec. 27, 2004).
European Patent Office (EPO) Communication for European application EP11169063.2 (Nov. 2, 2012).
Non-Final Office Action for U.S. Appl. No. 12/001,586 (Nov. 6, 2013) 9 pages.
"Echo System," Identita: The Powered Card™ Identity Provider, printed from website http://222.identita.com/sol_eco_sys.html, on Nov. 26, 2007; 2 pages.
Identita Technologies Inc., "Audio Authentication Devices," 2 pages.
Frost & Sullivan, "Leading European Financial Institution Implements Voice Verification Biometrics to Enrich Customer Experience," Jul. 2006; 13 pages.
"VoiceVault," VoiceVault™ World Leaders in Voice Verification, printed from website http://www.voicevault.com/ca.aspx on Nov. 13, 2007; 2 pages.
"VoiceVault," VoiceVault™ World Leaders in Voice Verification, "What is 'two factor authentication'?," printed from website http://www.voicevault.com/twofactor.aspx on Nov. 13, 2007; 2 pages.
"VoiceVault," VoiceVault™ World Leaders in Voice Verification, "How VoiceVault Works," printed from website http://www.voicevault.com/works.aspx on Nov. 13, 2007; 1 page.
Non-Final Office Action for U.S. Appl. No. 11/318,414 mailed on Nov. 13, 2008, 7 pages.
Non-Final Office Action for U.S. Appl. No. 11/318,424 mailed on Dec. 1, 2008, 13 pages.
Non-Final Office Action for U.S. Appl. No. 12/001,586 mailed on Apr. 29, 2011, 8 pages.
Final Office Action for U.S. Appl. No. 11/412,997 mailed on May 11, 2010, 21 pages.
U.S. Appl. No. 12/882,096, filed Sep. 14, 2010, Varghese et al.
Notice of Allowance for U.S. Appl. No. 11/412,997 mailed on Dec. 14, 2010; 6 pages.
Non-Final Office Action for U.S. Appl. No. 12/001,586 mailed on Oct. 26, 2010; 13 pages.
Birget et al., "The Graphical Passwords Project," printed from website http://clam.rutgers.edu/~birget/grPssw/, on Nov. 26, 2007; 2 pages.
Government of India Patent Office Examination Report for application IN4248/KOLNP/2007 mailed Jan. 30, 2014.

* cited by examiner

TECHNIQUES FOR FRAUD MONITORING AND DETECTION USING APPLICATION FINGERPRINTING

CROSS-REFERENCES TO RELATED APPLICATIONS

The present application is a continuation-in-part of U.S. patent application Ser. No. 11/412,997, filed on Apr. 28, 2006, entitled "System and Method for Fraud Monitoring, Detection, and Tiered User Authentication," which is incorporated herein by reference in its entirety for all purposes.

BACKGROUND OF THE INVENTION

Embodiments of the present invention relate to computer security, and more particular relate to techniques for fraud monitoring and detection using application fingerprinting.

With the growth of the Internet, an ever increasing number of businesses and individuals are conducting transactions online. Many transactions, such as banking-related transactions, shopping-related transactions, and the like, require sensitive information (e.g., authentication information, financial information, etc.) to be transmitted between, and stored on, end-user and service provider computers. This widespread use of sensitive information for online transactions has lead to the proliferation of identity theft, various types of hacking attacks, and online fraud.

In a typical transaction between a user and an online service provider, the user submits one or more requests comprising user-entered data to the service provider's application/system. If the transaction is in a "pre-authentication" phase (i.e., the user has not yet been authenticated), the one or more requests may include authentication information, such as a username, password, personal identification number (PIN), and/or the like, that is used to by the service provider to verify the user's identity. If the transaction is in a "post-authentication" phase (i.e., the user has already been authenticated), the request may include transaction information, such as a credit card number, address, and/or other data, that is used to carry out the transaction. FIG. 1 illustrates an exemplary system 10 that may be used for submitting user requests to a service provider application. In this example, the user of system 10 enters authentication information (e.g., a user ID and password) via keyboard 12 into a user interface 18. User interface 18 is displayed on a display 16 of user computer device 14.

Prior art systems implement a number of safeguards for protecting the information that is transmitted from a user computer to a service provider application (typically running on a remote server). For example, the widely-used TCP/IP communication protocol includes security protocols built on the secure socket layer (SSL) protocol to allow secure data transfer using encrypted data streams. SSL offers encryption, source authentication, and data integrity as a means for protecting information exchanged over insecure, public networks. Accordingly, many service provider servers and applications use SSL, or similar security protocols, to exchange data between remote servers and local user systems.

Despite these known precautions, a user's sensitive information (e.g., authentication information, transaction information, etc.) remains vulnerable between its entry by the user and its encryption prior to remote transmission. In addition, sensitive information sent from a service provider application is vulnerable during the period after its decryption at a user's computer and until its display. This information can be surreptitiously captured by fraudsters/hackers in a number of ways. For example, cookie hijackers may be used to copy sensitive information from web browser cookies. Further, keyboard loggers and mouse click loggers may be used to intercept and copy mouse clicks and/or depressed keys after user entry but before processing by a web browser or other software.

Even graphical user interfaces that represent on-screen keypads and keyboards with selectable graphics for user entry (instead of, or in addition to, providing fields for text entry) are vulnerable to mouse click loggers, screen capture loggers, and the like. FIGS. 1-3 illustrate prior art examples of such interfaces. As shown, each alphanumeric character in the graphical interfaces is represented by a unique graphical image (e.g., the pixels forming the number "1"). Screen capture loggers can use optical character recognition (OCR) technology to decipher characters selected by mouse clicks and the corresponding alphanumeric graphics in order to ascertain the actual alphanumeric text characters of a user's ID and/or password. In addition, sophisticated screen capture loggers can use checksum and/or size characteristics of the graphic images in order to ascertain the data item corresponding to a particular graphic image selected by a user's mouse click during data entry. In these ways, screen capture loggers can acquire the sensitive information even when the graphical user interface has, for example, rearranged the order of alphanumeric characters on the graphical keypad or keyboard.

Further, once a fraudster/hacker has successful stolen the authentication credentials of a legitimate user and logged into a service provider application as the user, the fraudster/hacker is generally free to submit whatever data he/she desires to carry out fraudulent transactions or exploit application-level vulnerabilities in the application. For example, in a common type of online attack known as SQL injection, a fraudster/hacker can exploit faulty error-handling or other flaws in the input field processing of a web-based application to submit application data that contains malicious SQL statements. These embedded SQL statements are executed by the application's backend database, enabling the fraudster/hacker to modify, delete, and/or view any data in the system.

One known method for preventing SQL injection and other such data-driven attacks involves the use of predefined signatures. In this method, a system administrator or other entity will identify a list of data strings that are known to be malicious (such as SQL commands) and store signatures of those data strings in the system. In addition, a process will monitor the network streams between user computers and the service provider application (e.g., HTTP traffic) and compare the data transferred via those streams with the predefined signatures. If a particular piece of data originating from a user computer matches one of the predefined signatures, the submission is determined to be malicious or fraudulent.

Unfortunately, the above approach is problematic for several reasons. First, since this approach can only detect predefined data strings, it is likely that this approach will be unable to detect all of the different permutations of data that may be used in a data-driven attack. Second, the predefined list must be updated manually as new types of malicious data are discovered, leading to increased operation and maintenance costs. Third, this approach is unable to properly classify data that may or may not be fraudulent or malicious based on the context in which it is submitted. For example, a request to wire transfer a dollar amount in excess of $10,000 may be fraudulent if submitted from a user account that does not have a history of transferring such large amounts, but may not be fraudulent if submitted from a user account that is regularly used to transfer $10,000 or more.

SUMMARY OF THE INVENTION

Embodiments of the present invention address the foregoing and other such problems by providing techniques for fraud monitoring and detection using application fingerprinting. As used herein, an "application fingerprint" is a signature that uniquely identifies data submitted to a software application. In an embodiment, a plurality of historical application fingerprints is stored for data previously submitted to a software application. Each historical application fingerprint is associated with one or more contexts in which its corresponding data was submitted. For example, the one or more contexts may identify a user that submitted the data, a device from which the data was submitted, a location from which the data was submitted, and/or the like. When new (i.e., additional) data is subsequently submitted to the application, a new application fingerprint is generated based on the new data, and the new application fingerprint is associated with one or more contexts in which the new data was submitted. The new application fingerprint is then compared with one or more historical application fingerprints that share the same, or substantially similar, context(s). Based on this comparison, a risk score is generated indicating a likelihood that the new data was submitted for a fraudulent and/or malicious purpose.

According to one embodiment of the present invention, a method for detecting anomalous (e.g., fraudulent or malicious) data submitted to a software application comprises receiving first data submitted via an input field of the application, and generating a first application fingerprint based on the first data, where the first application fingerprint is associated with one or more first contexts, and where the one or more first contexts represent contexts in which the first data was submitted. The method further comprises comparing the first application fingerprint with at least one second application fingerprint, where the at least one second application fingerprint is based on second data previously submitted via the input field, and where the at least one second application fingerprint is associated with one or more second contexts substantially similar to the one or more first contexts. A risk score is then calculated based on the comparison of the first application fingerprint and the at least one second application fingerprint, the risk score indicating a likelihood that the first data was submitted for a fraudulent or malicious purpose.

In one set of embodiments, the first application fingerprint is based on one or more of: a data size of the first data, a data type of the first data, and a data content of the first data.

In another set of embodiments, the one or more first contexts include one or more of: a user context identifying a user that submitted the first data, a device context identifying a device used to submit the first data, a location context identifying a location from which the first data was submitted, and a workflow context identifying a workflow of the software application that was being performed when the first data was submitted. In an embodiment, the one or more first contexts are configurable.

In another set of embodiments, the step of calculating the risk score is further based on one or more third contexts representing contexts in which the first data was submitted, where the one or more third contexts are distinct from the one or more first contexts. In an embodiment, the one or more third contexts include one or more of: a user context identifying a user that submitted the first data, a device context identifying a device used to submit the first data, a location context identifying a location from which the first data was submitted, and a workflow context identifying a workflow of the software application that was being performed when the first data was submitted. If the one or more third contexts include the device context, the risk score may be increased if the device context identifies a device that is unknown or on a device black list. Further, if the one or more third contexts include the location context, the risk score may be increased of the location context identifies a location that is unknown or on a location black list.

In another set of embodiments, the step of calculating the risk score comprises calculating a degree of similarity between the first application fingerprint and the at least one second application fingerprint, and calculating the risk score based on the degree of similarity.

In another set of embodiments, the method above further comprises comparing the first application fingerprint with at least one third application fingerprint, where the at least one third application fingerprint is a predefined application fingerprint based on third data that is known to be malicious or fraudulent. The risk score is then updated based on the comparison of the first application fingerprint with the at least one third application fingerprint. In an embodiment the third data comprises one or more SQL commands or statements.

In another set of embodiments, the method above further comprises presenting an authentication interface to the user that submitted the first data if the risk score exceeds a predefined threshold. In an embodiment, presenting the authentication interface comprises determining interface selection criteria based on the risk score, and selecting the authentication interface from among a plurality of authentication interfaces based on the interface selection criteria.

In another set of embodiments, the method above further comprises generating an alert from an administrator of the software application if the risk score exceeds a predefined threshold.

In another set of embodiments, the steps of receiving, generating, comparing, and calculating are performed during runtime of the software application.

In another set of embodiments, the software application is a web-based application.

According to another embodiment of the present invention, a system for detecting anomalous data submitted to a software application is provided. The system comprises a storage component configured to store a plurality of historical fingerprints, each historical fingerprint being based on historical data submitted to the software application via an input field of the software application. The system further comprises a processing component in communication with the storage component, the processing component being configured to receiving first data submitted via the input field; generate a first application fingerprint based on the first data, where in the first application fingerprint is associated with one or more first contexts, and where the one or more first contexts represent contexts in which the first data was submitted; and compare the first application fingerprint with at least one historical fingerprint in the plurality of historical fingerprints, where the at least one historical fingerprint is associated with one or more second contexts substantially similar to the one or more first contexts. A risk score is then calculated based on the comparison of the first application fingerprint with the at least one historical fingerprint, the risk score indicating a likelihood that the first data was submitted for a fraudulent or malicious purpose. In an embodiment, the processing component is configured to run the software application.

In another set of embodiments, the storage component is further configured to store one or more access policies, each access policy comprising rules for calculating the risk score. In an embodiment, the one or more access policies are defined by a service provider of the software application.

According to yet another embodiment of the present invention, a machine-readable medium is disclosed, the machine-readable medium having stored thereon a series of instructions which, when executed by a processing component, cause the processing component to detect anomalous data submitted to a software application. In an embodiment, the series of instructions cause the processing component to receive first data submitted via an input field of the software application, and generate a first application fingerprint based on the first data, where the first application fingerprint is associated with one or more first contexts, and where the one or more first contexts represent contexts in which the first data was submitted. The series of instructions further cause the processing component to compare the first application fingerprint with at least one second application fingerprint, where the at least one second application fingerprint is based on second data previously submitted via the input field, and where the at least one second application fingerprint is associated with one or more second contexts substantially similar to the one or more first contexts. A risk score is then calculated based on the comparison of the first application fingerprint with the at least one second application fingerprint, the risk score indicating a likelihood that the first data was submitted for a fraudulent or malicious purpose.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

In the drawings, the use of like reference numbers in different drawings indicates similar components.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details.
System Configurations/Environments System configurations/environments in accordance with embodiments of the present invention are described in detail below. Headings included herein are used solely to provide clarity and are not intended to limit the scope of the present disclosure.

Figure 13A:
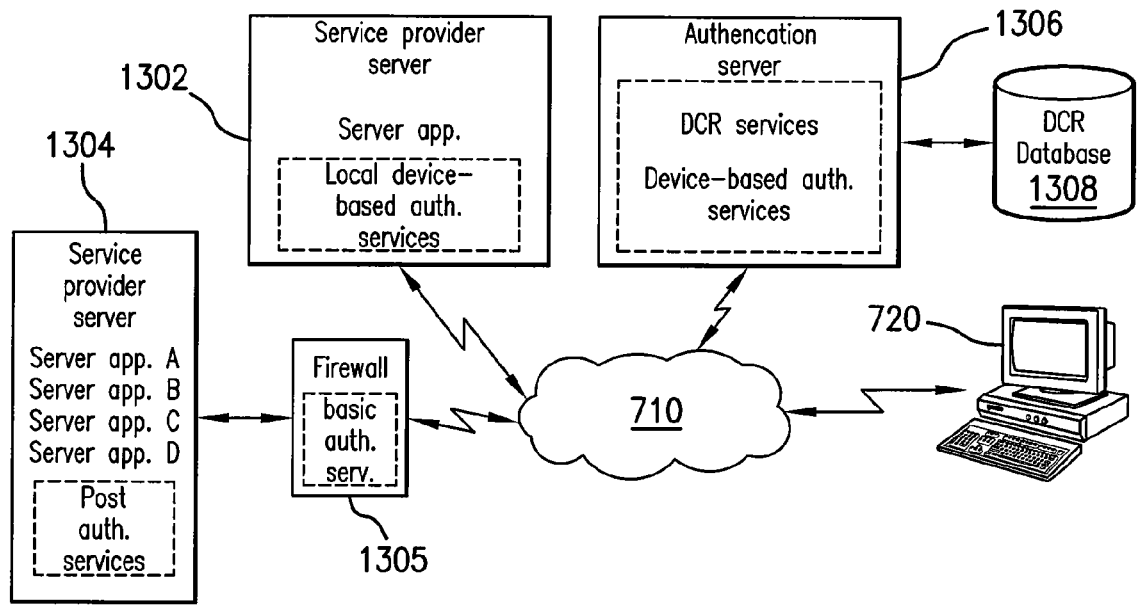
FIGS. 13A and 13C are simplified block diagrams illustrating exemplary system environments in accordance with an embodiment of the present invention.

FIG. 13A is a simplified block diagram illustrating a first system environment in accordance with an embodiment of the present invention. The system environment includes one or more service provider servers 1302, 1304 and an authentication server 1306. Servers 1302, 1304, 1306 are interconnected via network 710 to one or more user computing devices 720, which are used by end-users to submit various requests (e.g., login requests, transaction requests, etc.) to service provider applications A, B, C, D, etc. Servers 1302, 1304, 1306 are generally structured as known in the art, and include a CPU, volatile memory (e.g., RAM), disc-based or other nonvolatile memory, communication interfaces, optional user interface equipment, and the like. Database 1308 is communicatively coupled with authentication server 1306 and is configured to store data used in authentication processes, such as device, location, workflow, and application fingerprints/histories. Network 710 is also generally structured as known in the art and may represent a private intranet, the public Internet, or the like. User computing device 720 may be a workstation-type computer, a PC-type computer, a terminal, or the like.

In one set of embodiments, the various fraud detection, monitoring, and authentication processes of the present invention are implemented using a client/server type architecture (or, more generally, a distributed systems architecture). Accordingly, these processes may be executed either on the service provider's servers (e.g., 1302, 1304) or on a dedicated authentication server (e.g., 1306). In the embodiment shown, authentication server 1306 hosts a Device Central Repository (DCR) service.

In various embodiments, the DCR receives, stores, and makes available information (e.g., fingerprints) identifying user devices and the fraud risks associated with those devices. This information may include black lists and/or white lists of devices with a higher or lower risks of fraud respectively. This information may be gathered from the authentication experiences of the service providers participating in an implementation of the present invention, from other concurrent and intercommunicating implementations of the present invention, from third party data sources, and/or the like. In some embodiments, authentication server 1306 can host service provider applications.

As described above, authentication server 1306 can host the actual fraud monitoring, detection, and authentication processes of the present invention, which are configured as server processes responding to requests from service provider applications executing on service provider servers 1302, 1304. In these embodiments, service provider servers 1302, 1304 need not run all (or any) fraud monitoring, detection, or authentication processes, and can instead can access those processes it does not host (or all processes) on authentication server 1302. In other embodiments, a service provider system can execute all fraud monitoring, detection, and authentication processes, and therefore need only access authentication server 1302 for optional DCR services. In FIG. 13A, application provider server 1302 does not perform pre-authentication services, but does performs post-authentication services such as workflow and application fingerprinting.

In various embodiments, pre-authentication services can be performed on a firewall machine (or other type of network gateway machine). As shown in FIG. 13A, firewall 1305 performs pre-authentication services for service provider server 1304. Once a user is authenticated, that user can access service provider applications executing on server 1304, such as applications A, B, C, D, etc. A firewall machine can perform all pre-authentication services, or a subset of pre-authentication services (referred to herein as "basic authentication services").

Basic authentication services are limited to user device fingerprinting and confirmation of basic user device data, such as IP address, device operating system, device ID, and the like. As described in further detail below, a user's computing device is typically provided with a cookie that includes the identifying information of the device. This cookie can be reviewed by firewall 1305 upon login to verify that it matches what the entity knows about the user. Discrepancies can be identified and scored to determine whether to allow access or whether to apply secondary authentication protocols, such as a security question, before allowing access. This embodiment is applicable to an entity such as an organization, company, or law firm for authenticating remote log-ins from its employees, members, or other users, where these employees or users number approximately 10,000 or less.

Figure 13B:
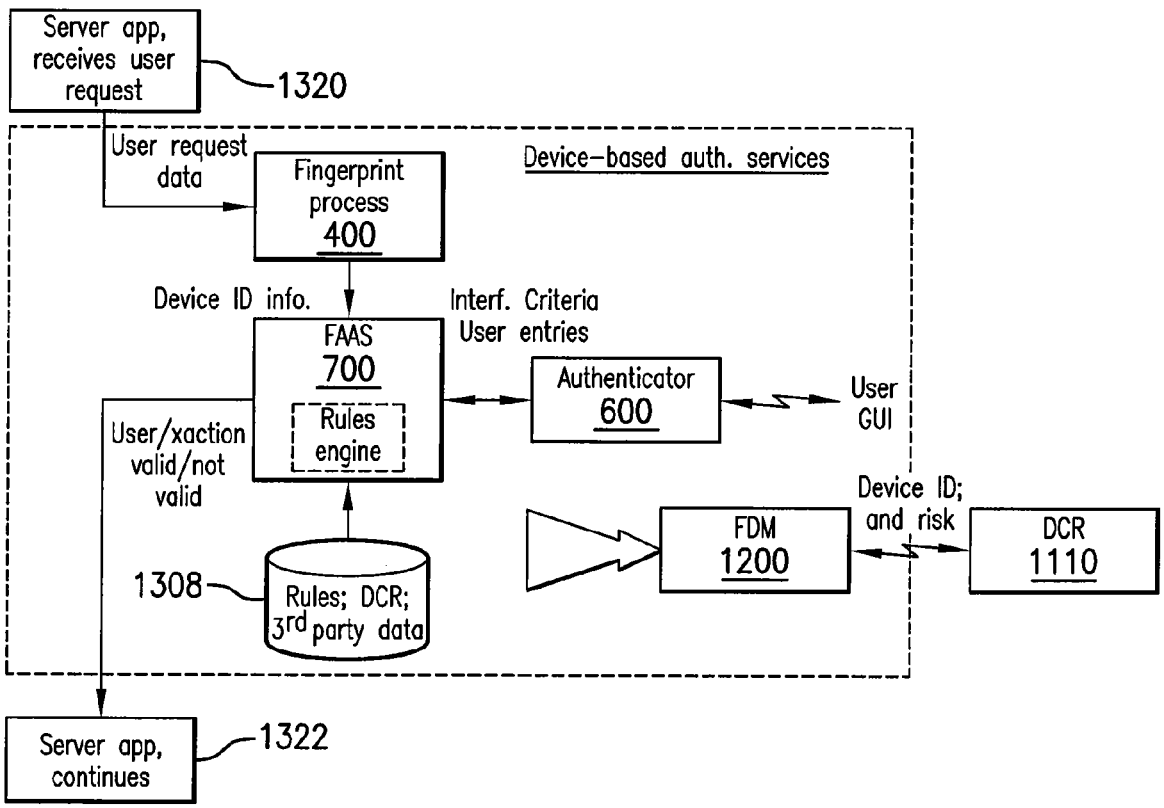
FIG. 13B is a simplified block diagram illustrating various computer-implemented processes that cooperate to provide authentication services (primarily pre-authentication services) in accordance with an embodiment of the present invention.

FIG. 13B is a simplified block diagram illustrating various computer-implemented processes that cooperate to provide authentication services (primarily pre-authentication services) in accordance with an embodiment of the present invention. As illustrated, these processes include fingerprint process 400, Fraud Analysis and Alert Service (FAAS) 700, Authenticator service 600, and Flagged Device Module (FDM) 1200. Links between processes are labeled by important input and output data types.

Typically, authentication services are invoked when a server provider application/system receives a user request 1320 that requires authentication. In the case of pre-authentication, the most common user request is a login request to access an application or system. Other requests usually handled by post-authentication services include, e.g., transaction requests involving large amounts of money. User requests can be received directly from communication subsystems, or alternatively, can be forwarded from the service provider application or system across an interface to the authentication processes of FIG. 13B.

In an embodiment, authentication services can be invoked through an externally available application programming interface (API). Table 1 list a selection of exemplary API requests.

TABLE 1

Example API requests

| # | Description | Action | Request XML | Response XML |
|---|---|---|---|---|
| 1 | Pre-authentication request to fingerprint the device | FingerPrintRequest | FingerPrintRequest.xml | FingerPrintResponse.xml |
| 2 | Updates the authentication status for the authentication session | UpdateAuthResult | UpdateAuthResultRequest.xml | FingerPrintResponse.xml |
| 3 | Processes the rules | ProcessRules | Process Rules Request. | ProcessRulesRespon |

Typically, the first request is sent from a service provider application to begin an authentication of a device from which a user request has been received. The second request is sent when the service provider application wishes to check authentication status for performing a transaction, such as a high-value transaction. The third request provides riles and has those rules processed in view of the current authentication information characterizing a user or session.

Fingerprint process 400 is the first authentication process invoked with input data describing the user request. Fingerprint process 400 gathers identifying information describing the device from which the user request originated and creates a device identifier (hereinafter referred to as a "Device ID"). The Device ID (and optionally other device identifying information) is stored on the user computing device from which it can be retrieved and form part of the device identifying information to be used during a subsequent fingerprinting.

Next, FAAS process 600 is invoked with the Device ID (and optionally other device and/or user identifying information). This process evaluates its input identifying information and can, for example, recommend to the service provider application/system that the request should be processed further, or recommend that the request be blocked (referred to herein as "actions"). This process can also provide risk alerts and risk scores describing the relative risks of the user request so that the service provider application/system can make an authentication decision. In an embodiment, FAAS evaluation begins with retrieving forensic information related to the characteristics of the current request that are apparent in the input request information. Information sources can include system DCR services, which stores an authentication system's past authentication results, and third party data services, which can provide a wide range of data (e.g., geolocation data providing likely geographical source of the current request). The input data and the retrieved forensic data are analyzed by a rules-based decision process in order to determine output actions, risk alerts, and risk scores. In various embodiments, the Device ID of a user device is usually available and is the primary item used to identify an authorized user. In some embodiments, even when a Device ID is available and recognized, the user may be required to provide additional security information before being allowed access. Other conventional security protocols (i.e., personal questions, selection of personal information from a multiple choice question, etc.) or even a higher level of security (i.e., telephone IP administrator, call to provide voice recognition, etc.) can be used. When a user knows in advance that a different user computer will be used for access at certain times (e.g. business travel to a new location with use of a different computer contemplated) then this information can be provided to the entity and its IP administrator so that the rules for that particular user and time period can be changed to facilitate access to the system and its application.

If a request is to be further processed, a further action is the selection of graphical (or other) authentication user interfaces for authenticating a newly arrived user or an existing user making a request that needs particular authentication. In an embodiment, authentication interface selection criteria is determined in accordance with an evaluated risk scores and any risk alerts. The selection criteria are then used to select an authentication interface having a security level that is commensurate the identified risk of fraud. In some embodiments, the risk information can also be provided to a service provider application/system, which can then perform, for example, more thorough checking of authentication data or request the authentication services of the present invention to re-authenticate the user or request. This can involve, for example, seeking responses to detailed authentication questions, obtaining biometric identification information (e.g., fingerprints, retinal scans, etc.), obtaining voice prints, and/or the like.

Once authentication interface criteria are determined, Authenticator process 700 is invoked with the criteria and selects a particular authentication user interface from a user interface database based on the criteria. Authenticator process 700 then presents the selected interface at the originating user device, and receives data entered in response to the interface presentation. The entered data is subsequently used as part of the authentication decision by service provider application 1322. The server provider application, or FAAS 700, or both together, then decide whether on not to authenticate the request.

DCR process 1110 gathers the results of the current request authentication processing and stores them in a DCR database in association with the identifying information (for example, the Device ID) of the originating user device. These stored results may include, for example, whether or not the request was validated and/or whether or not the request was found to be fraudulent. In this manner, the DCR database can provide a historical record of the results of previous request authentication processing to guide FAAS 700 in future authentication request processing. The DCR database includes at least data obtained from the current service provider. In various embodiments, it also includes data from other service providers so that device risk information can be shared and the accuracy of authentication processing can be improved.

FDM 1200 performs the actual gathering and assembly of the results of the current request authentication processing. Data from the current request can optionally be supplemented by the third party data similar to the data already retrieved by FAAS 700 and/or other data retrieved by FAAS 700 relevant to evaluating the current request. FDM process 1200 can execute either locally or remotely as part of authentication services, or can be implemented as part of DCR services.

Figure 13C:
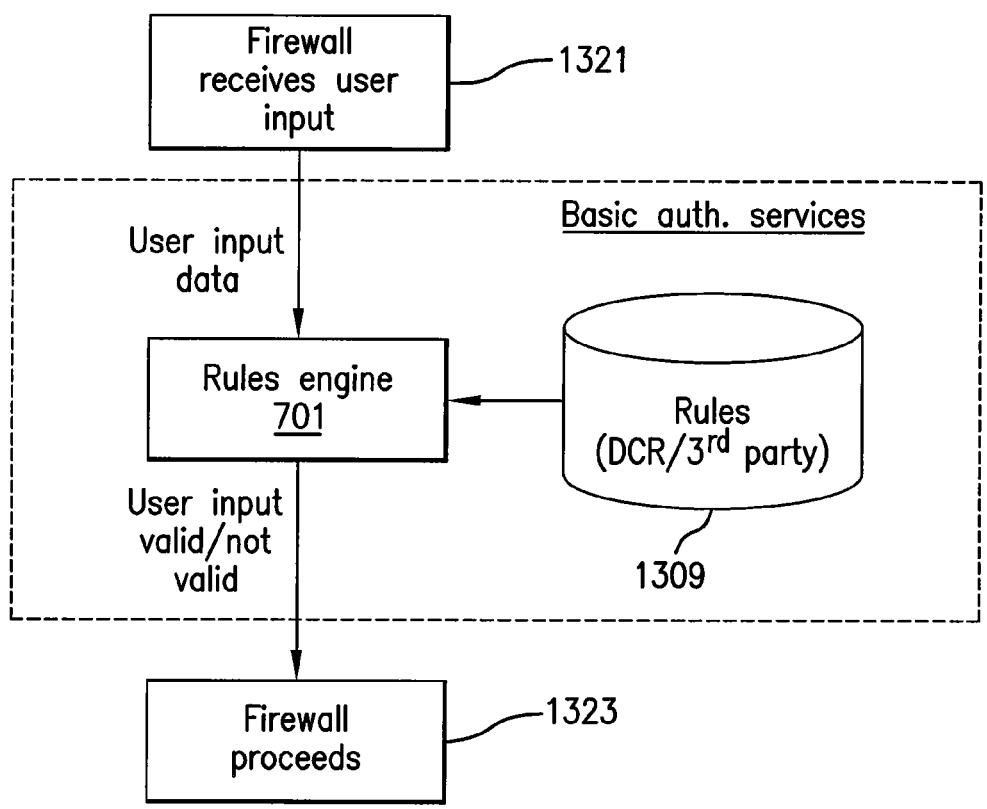

FIG. 13C is a simplified block diagram illustrating a system environment for performing basic authentication services in a firewall or router in accordance with an embodiment of the present invention. This particular embodiment performs only the minimal processing necessary for authentication via rules engine process 701. Process 701 is invoked when a user request is received by the firewall/router (1321). In one embodiment, process 701 determines actions and risk scores from input data included in the user request and rules retrieved from database 1809 (either supplied by a service provider or default rules available from the authentication system). The rules can be either proactive or reactive. For example, access can be blocked unless the fraud risk is low, or allowed unless the fraud risk is high. In other embodiments, process 701 can also retrieve and rely on data from the DCR database and/or third party sources. Actions, risk scores, and/or risk alerts are then provided for further processing by the firewall (1323).

When the system finds an elevated risk score, it can evaluate rules in view of the risk score and carry out actions, alerts, or risk score reporting. Table 2 provides categories of responses to an elevated risk score.

TABLE 2

Events & Risk Scoring Engine

Determine and output weighted risk score
Customizable thresholds
Customizable actions
Customizable alerts One action is the setting of an Internal flag or adding to a watch list so that the service provider can follow up later. Another action is online or out of band secondary authentication, preferably based on a challenge response model. For example, online secondary authentication can require a user to respond to an email sent to a registered email address. Out of band authentication can further include various biometrics, such as a voiceprint which requires a user to verbally respond to a challenge.

Embodiments of the present invention can retrieve various types of information from a user request, such as the device from which a request originates, the user originating the request, and the transactions requested by the user, and data submitted in the request. Efficient handling of this information is advantageous, especially in commercial applications that are required to service a large number of concurrent users. Thus, in various embodiments, this information is stored for online use in a condensed or summary form, and for offline use in nearly full or full detail. Online uses include, for example, fraud detection, real-time authentication, authentication updating, and the like. Offline uses include, for example, data mining, rule refinement, and the like.

The condensed or summary form of request data described above is referred to herein as a fingerprint. In an embodiment, a fingerprint is created by dividing the possible values of a category of data or authentication criteria into a number of "bins." In this embodiment, the fingerprint of a particular type of data (e.g., device fingerprint, location fingerprint, workflow fingerprint, application fingerprint) is a binary token representation of the data that indicates which bins have data and which do not. This binary token representation can be optionally compressed using known techniques. Thus, a user's authentication and transaction requests can be represented as several binary tokens.

By way of example, in a typical online application, there may be 20 unique pre-identified sensitive transaction sequences (workflows). Each workflow can be characterized by, for example, ten bins or variables, each variable having, for example, ten bind values. In this case, a user can be characterized by a fixed number of fingerprints with each user having on average, for example, ten unique fingerprints.

Functional Configurations

Generally speaking, embodiments of the present invention provide techniques for determining whether requests (e.g., authentication requests, transaction requests, etc.) submitted by users of a software application (e.g., online shopping application, online banking application, etc.) are fraudulent and/or malicious. In an embodiment, a copy of the request or information included in the request is received. This information is then processed and used to output, for example, risk scores, risk alerts, and/or actions (or action recommendations) with respect to the request. Risk scores and alerts are indicia of the probability that the user request is incorrect, malicious, and/or fraudulent. In an embodiment, the risk scores are generated based on one or more fraud detection inputs that are weighted and analyzed in real time using analytic processes customizable for individual service providers. The fraud detection inputs include for example, a user fingerprint identifying the user that submitted the request, a device fingerprint identifying a device from which the request was submitted, a location fingerprint identifying a location of the user device, a workflow fingerprint identifying a transaction workflow from which the request was submitted, an application fingerprint identifying data submitted in the request, and data from one or more third party data sources. This information can be provided to service provider applications/systems for use in their internal authentication/fraud detection processes. The embodiments of the present invention can also recommend or initiate actions according to service provider-defined guidelines or rules. These actions are generally directed to gathering information for authenticating the request being processed.

In various embodiments, the available, security-relevant information related to a user request (i.e., request attributes) is divided into related information groupings referred to as criteria, wherein each criteria contains several pieces of data concerning a user request. For example, the criteria may include device criteria, location criteria, user criteria, workflow criteria, and application data criteria. Groups of rules, preferably criteria-specific, are then used to evaluate the criteria and generate the risk scores, alerts, and/or actions. Depending on the particular request submitted by a user, more or less criteria data will be available, and various types of criteria will have varying importance. For example, in the pre-authentication phase of a transaction, criteria related to workflow (e.g., a sequence of related transactions by a user) are usually not available. In contrast, in the post-authentication, criteria related to initial authentication are usually less important.

Examples of pre-authentication criteria include location information and device information. Examples of post-authentication criteria include user information, workflow information, and application data information (i.e., data submitted to the application). Table 2 presents exemplary data relevant to each of these criteria.

TABLE 3

Example of Request Attributes

| | | |
|---|---|---|
| Pre-authentication | Location information | City, State, Country information and confidence factors |
| | | Connection type |
| | | Connection speed |
| | | IP address, routing type, and hop times |
| | | Internet service provider flag |
| | | Autonomous system number |
| | | Carrier name |
| | | Top-level domain |
| | | Second-level domain |
| | | Registering organization |
| | | A list of anonymizing proxies |
| | | Hostnames and routers |
| | Device information | Secure Cookies |
| | | Flash Cookies |
| | | Digitally signed device |
| | | Device & display Characteristics: |
| | | Operating System characteristics |
| | | Browser Characteristics |
| Post-authentication | User information | User identifications |
| | | Valid or not valid user |
| | | Authentication status |
| | Workflow information | Key Value Pairs: |
| | | Support multiples |
| | | Keys can be defined using Regular Expressions |
| | | Values can be defined in ranges |
| | | Pages accessed |
| | | Time spent on page |
| | | Transactions sequences |
| | Application data information | Data submitted by a user into one or more input fields of the application |

Figure 14:
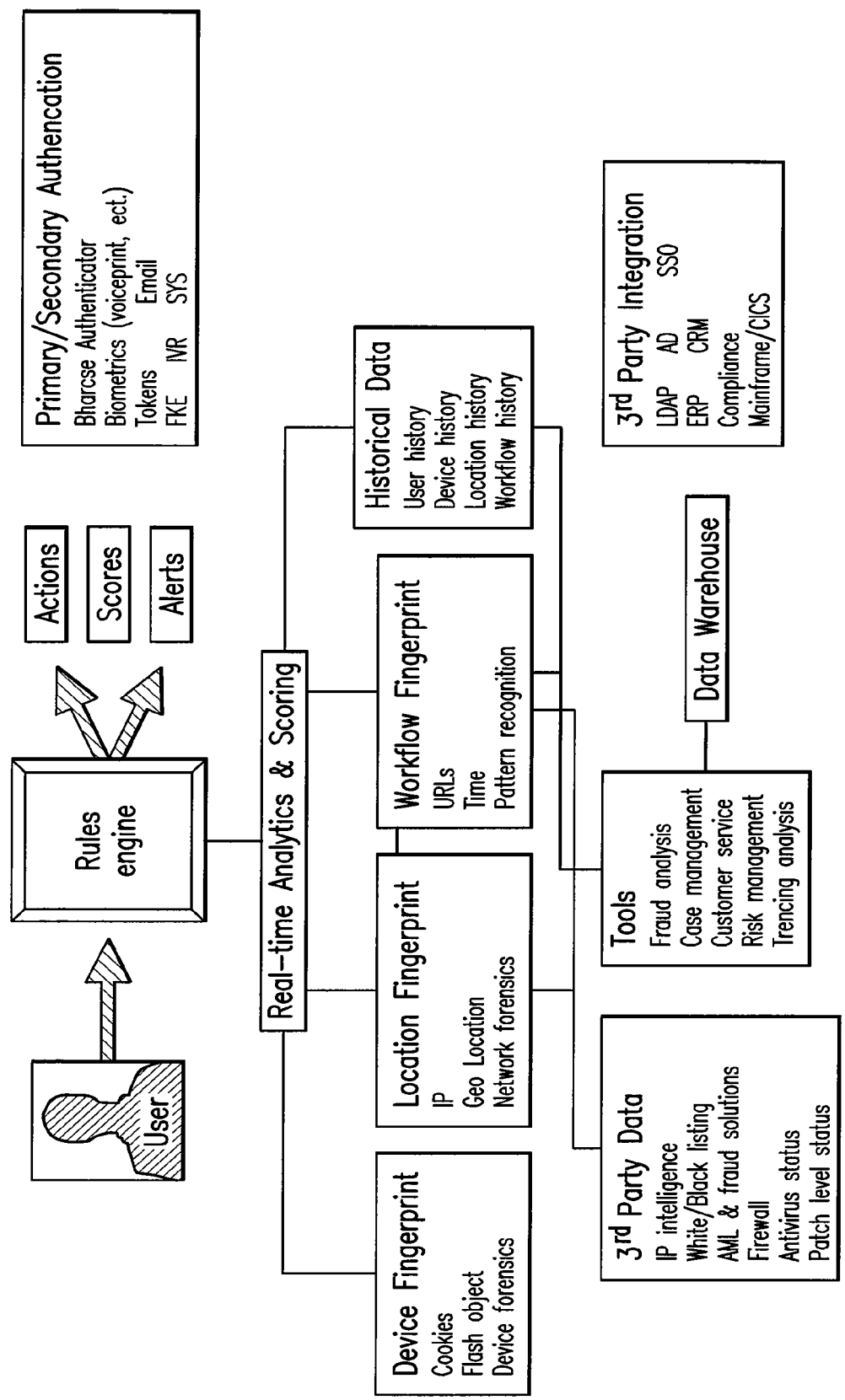
FIG. 14 is a diagram illustrating a functional configuration in accordance with an embodiment of the present invention.

FIG. 14 is a diagram illustrating a functional configuration of an embodiment of the present invention. The diagram includes the various request attributes of Table 2 (except for application data information). In an embodiment, the request attributes of the criteria are condensed into fingerprints—for example, a location fingerprint, a device fingerprint, a workflow fingerprint, and an application fingerprint (application fingerprinting is discussed in further detail below). The fingerprints are then processed to generate actions, risk alerts, and/or risk scores. One possible action is primary authentication, which is the process by which the user is initially identified and authenticated. Primary authentication is performed primarily based on location and device fingerprints, and can include presentation of one or more authentication interfaces at the user device. Another possible action is secondary authentication, which can be invoked during the post-authentication phase of a transaction if, for example, a particular piece of data submitted by the user appears to be malicious, thereby necessitating further authentication. Secondary authentication can include use of, for example, email, voiceprints, and/or the like.

Further, FIG. 14 illustrates that third party data can also be used evaluate user requests. In an embodiment, such third party data can be incorporated into various fingerprints. For example, third party data can include the presence or absence of firewall or of antivirus software on a user device, and/or the maintenance status of such software. Third party data can also include IP Intelligence, risk data, historical data (from a data warehouse), fraud network data, and so forth. Further, third party data describing characteristics of known risks pertaining to a particular location, device, user, and/or piece of data can be received from third party data warehouses and incorporating in various fingerprints, such as workflow fingerprints and application fingerprints. Yet further, third party evaluation tools can be integrated into or supplement the analytics and scoring process that is used to evaluate fingerprints.

Location information and device information are important criteria in the pre-authentication period. Location information characterizes the location of the device from which a request originates. Location can most easily be estimated from the device's IP address and the hierarchy of networks linking the device to the Internet. Device information characterizes the originating device itself, such as its hardware and software components. Table 3 present a more detailed catalog of device software and hardware characteristics that can be extracted from a device by a browser-hosted process.

TABLE 4

Exemplary hardware and software characteristics

|  | Device Information | HTTP Header | Flash Shared Object |
|---|---|---|---|
| Operating System | Operating System | X | X |
|  | Version | X |  |
|  | Patch | X |  |
| Browser | Browser | X |  |
|  | Version | X |  |
|  | Patch level | X |  |
|  | Http protocol version | X |  |
| Hardware | Screen DPI |  | X |
|  | Has Microphone |  | X |
|  | Has Printer Support |  | X |
|  | Has Audio Card |  | X |
|  | Screen Resolution |  | X |
|  | Screen Color |  | X |
| Software | Has Audio Encoder |  | X |
|  | Supports Video |  | X |
|  | Has MP3 Encoder |  | X |
|  | Can Play Streaming Audio |  | X |
|  | Can Play Streaming Video |  | X |
|  | Has Video Encoder |  | X |
| Location | Location | X |  |
|  | Language | X | X |
|  | Language Variant | X |  |

A further important component of device information (when available) is a secure token (e.g., a secure cookie) available from a device which has been previously used to interact with a service provider application. When a request is received from a user device, at least the available location and device information can be summarized, condensed, or fingerprinted and stored back on the device as a secure token. If another request then originates from this device, the secure token can be retrieved and its contents compared against the currently collected location and device information. Any mismatches can be weighted to form a risk score for use in risk analysis. Whether or not mismatches occur, a new secure token is generated from the currently retrieved information and stored back on the device.

In an embodiment, the secure token also includes a unique identifier generated by embodiments of the present invention. Comparing the unique identifier in a retrieved token with an expected or known unique identifier provides further information on which to base the risk score. Also, the unique identifier is particularly useful if location or device information cannot be obtained from a user device. In this scenario, the unique token may be the only identifying device information.

Post-authentication information includes user information, transaction (or workflow) information, and application data information. User information includes an identity of the user and the progress of the user through the initial authentication process. Transaction/workflow information includes information pertaining to the sequence and/or timing of transactions. In an embodiment, such transaction/workflow Information is extracted from a transaction request by looking for key expressions and then extracting the values (or ranges of values) and other information associated with the key. The sequence and timing of transactions (e.g., web pages visited) is packaged into workflow fingerprints which are summaries of a user's historical usage patterns.

Application data information includes data submitted to an application in the course of conducting a transaction. In an embodiment, historical data submitted to an application in a particular context (e.g., by a particular user, from a particular device, from a particular location, etc.) is stored as one or more application fingerprints. When a new (i.e., additional) piece of data is submitted to the application, a new application fingerprint is generated based on the new data, and the new application fingerprint is compared to one or more stored application fingerprints that share the same, or substantially similar, context. This comparison may then be used to generate one or more actions, a risk alert, and/or a risk score. Application fingerprinting is discussed in greater detail with respect to FIGS. 18-20 below.

FIG. 14 indicates that the criteria data described above, packaged into one or more fingerprints, may be processed and scored in real-time by fraud analytics driven by a rules engine. In order to provide authentication services concurrently to multiple service providers and service provider applications, the analytics and rules defining this processing are preferably grouped into functionally related modules that are seen as substantially interchangeable by the rules engine. Thus, fraud detection and authentication services can be provided to a plurality of service providers by via a single, generic rules engine (or multiple instances of a generic rules engine) that simply switches between modules as appropriate. Each service provider can define its own fraud detection and authentication rules by providing or more of these modules.

Such groupings of rules are referred to herein as policies or access policies. Table 5 illustrates policies that may be useful for a large number of applications/systems. Other types of policies may be defined as needed.

TABLE 5

Policies

| | |
|---|---|
| Security policies | Anomaly detection |
|  | Misuse detection |
|  | Intrusion detection |
|  | Predefined hacker models |
|  | Customizable models |
| Business policies | In session transaction monitoring |
|  | Business defined transaction rules |
|  | Key Value driven logic |
|  | Customizable models |
|  | Event, time and value pattern recognition |
| Workflow policies | Historical transactions |
|  | Behavioral analysis |
|  | Temporal analysis |
|  | Auto classification |
|  | Profiles of users |
|  | Predefined customizable risk models |

Policies can be enforced during pre-authentication (i.e., when a user is being authenticated) or during post-authentication (i.e., when a user is submitting transaction requests). In an embodiment, the rules engine automatically determines what models and policies to run based on the context of the request. Different sets of models can be configured to support different transaction types (e.g. bill pay, money transfer, password change, email change, etc.). In some embodiments, the models may be defined and written in Extensible Markup Language (XML). In these cases, after the initial integration, no further code changes are needed in the service provider applications. All models can be modified using a network interface or by replacing the XML definition file. Also, new models can be added seamlessly during operation of the embodiments of the present invention. Models are fully portable, so that they can be migrated from a simulation environment to a test and production environment. Additionally, policies can be configured for exceptions (e.g., "user not in user list," "device not a bank kiosk," etc.), and policies can be temporarily overridden based on, for example, a time period or one time exceptions.

Security policies typically seek to recognize known fraudster/hacker behaviors. These behaviors can be recognized using standards developed from cross-industry best practices. Business policies are primarily applicable post-authentication when a transaction session is ongoing. These policies generally represent standards established by a particular service provider for mitigating transaction risk. Workflow policies are primarily applicable post-authentication and compare fingerprints of past transaction session activities with fingerprints of the current session in order to detect unexpected patterns that may indicate fraud.

Figure 15A:
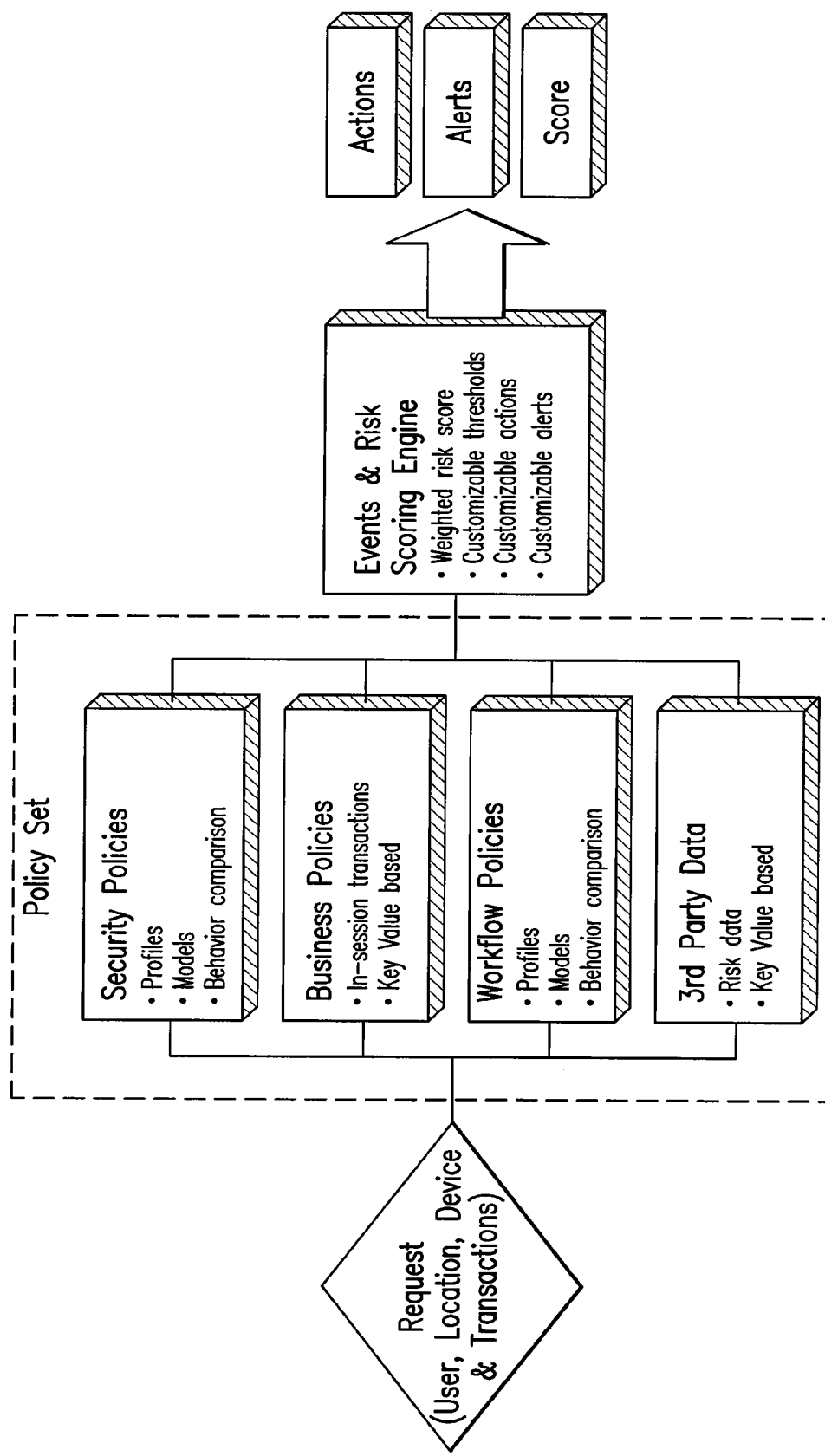
FIGS. 15A and 15B are diagrams illustrating a policy set and a security model for inclusion within the policy set in accordance with an embodiment of the present invention.

FIG. 15A is a diagram illustrating a functional configuration that implements policies (such as the policies of Table 4) in accordance with an embodiment of the present invention. As shown, an user request containing information such as device information, location information, transaction information, and application data information is received and analyzed (preferably concurrently) against the rules/analytics of one or more applicable policies. This analysis generates a risk score that is weighed against various thresholds in order to generate appropriate actions, alerts, and the like. In various embodiments, the weightings, thresholds, actions, and alerts can be customized for each service provider.

Figure 15B:
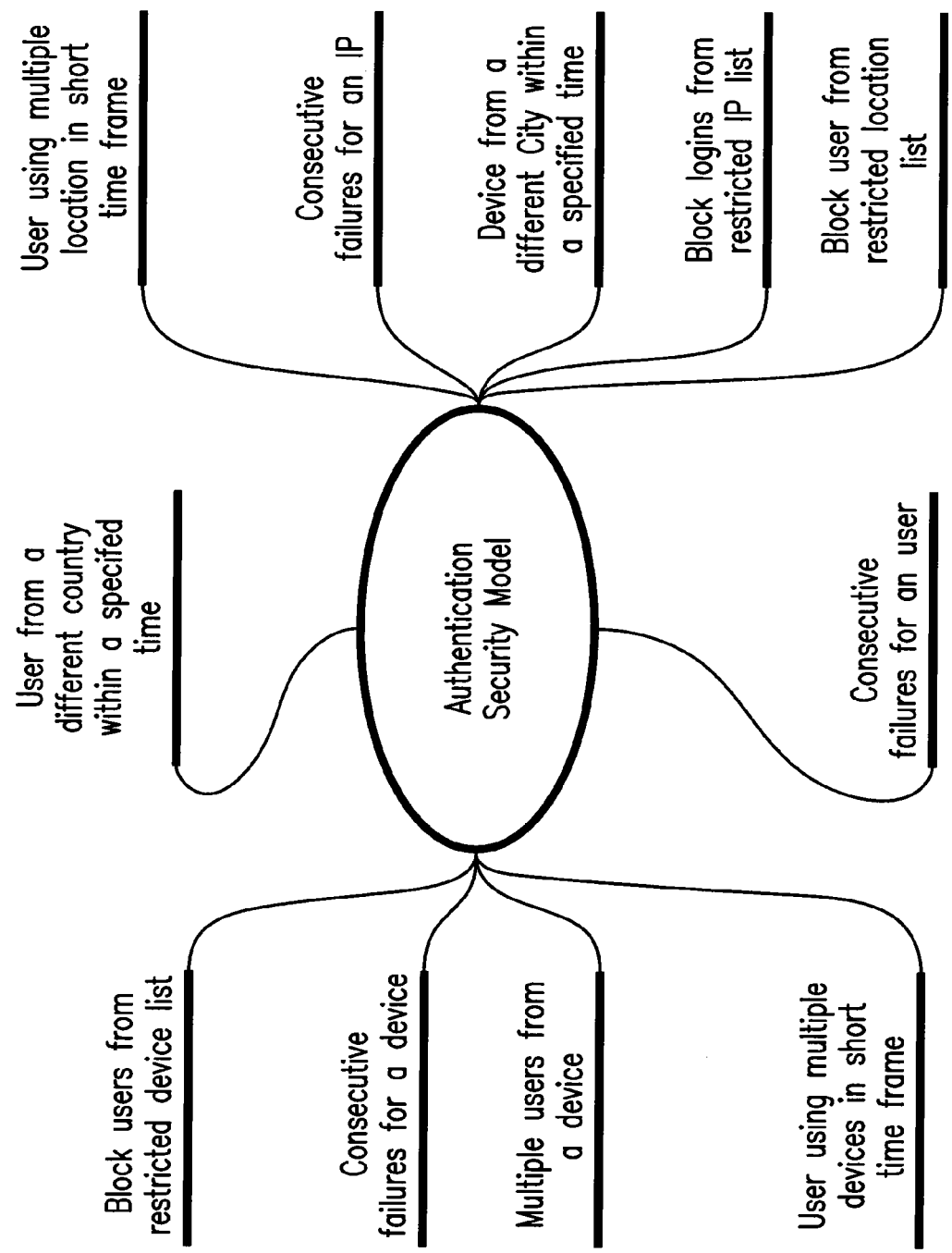

Examples of security, business, workflow, and third-party policies are now described in more detail, beginning with security policies. Security policies can be widely applied across most service providers and service provider applications and used both during pre- and post-authentication\. They can be applied, for example, during user login and during user transaction processing. Security models evaluate a plurality of data items (generally from the device and location criteria), thereby generating a security score. FIG. 15B illustrates an exemplary set of such data items. For example, a user who submits requests that appear to originate from multiple machines, or multiple cities, or multiple locations over an impossibly short duration of time will likely be a fraudster/hacker.

Each security policy includes models involving decisions based on risk patterns associated with user, device, and location information. The security models are based on known risk conditions and potentially risky behavior and are categorized into the following models. Tables 6A and 6B present illustrative security models.

TABLE 6A

Restricted model

| | |
|---|---|
| Location based rules | Logins from restricted countries. (e.g. OFAC countries) |
| | Logins from restricted IP addresses |
| | Logins from restricted anonymizers and proxies |
| User based rules | Logins from restricted users list |
| | Multiple consecutive failures for the user |
| Device based rules | Logins from restricted devices |
| | Multiple consecutive failures from the device |
| | Device using stolen cookies |
| | User using the device for the first time |

TABLE 6B

Hacker model

| | |
|---|---|
| Location based rules | User login from different geographical location (city, state or country) within a given time period |
| | Multiple logins from a given EP address within a given time period |
| User based rules | User login from different geographical location (city, state or country) within a given time period |
| Device based rules | User login from different device within a given time period |
| | Multiple failures from a given device within a given time period |
| | Multiple logins from a given device within a given time period |
| | Same device used from different geographical location within a given time period |

A service provider may find certain conditions associated with a user request require that the user's access must be prevented. Restricted models gather data items and factors relevant to determining that a particular access must be prevented. Alternatively, a service provider may find certain user behavior patterns suggest that this user is a hacker or malicious. Hacker models accordingly gather relevant data items and factors.

Table 7 presents a further example of data items relevant to security policies.

TABLE 7

| Sample security policy data items | | | | |
|---|---|---|---|---|
| Timed city for user | USER: from City | rule.type.enum.user | Check whether the last login attempt for the user | {Seconds elapsed} |
| Timed country for user | User: from Country | rule.type.enum.user | Check whether the last login attempt for the user | {Seconds elapsed} |
| Timed device for user | USER: From Device | rule.type.enum.user | Check whether the last login attempt for the user | {Seconds elapsed} |
| Timed IP for user | USER: From IP | rule.type.enum.user | Check whether the last login attempt for the user | {Seconds elapsed} |
| Timed IP Class C Address for user | USER: IP Subnet | rule.type.enum.user | Check whether the last login attempt for the user | {Seconds elapsed} |

TABLE 7-continued

Sample security policy data items

| | | | | |
|---|---|---|---|---|
| Timed state for user | USER: From State | rule.type.enum.user | Check whether the last login attempt for the user | {Seconds elapsed} |
| Digital Cookie mismatch | USER: Cookie Mismatch | rule.type.enum.device | Checks whether the cookie the user sent | |
| Attempts not status for device | DEVICE: Logins with false Status | rule.type.enum.device | Maximum login attempts with other than the given | {authentication status} {Last number of attempts} |
| Attempts status for device | DEVICE: Logins with true Status | rule.type.enum.device | Maximum login attempts with the given status for | {authentication status} {Last number of attempts} |
| In group for device | DEVICE: In Group | rule.type.enum.device | If the device is in the | {Group ID} |
| Timed user number for device | DEVICE: Max Users | rule.type.enum.device | Maximum users using this device for the past x | {Seconds elapsed} {The maximum number of |
| Fully Fingerprinted | DEVICE: Is Fingerprinted | rule.type.enum.device | Checks whether the user was identifiable from all | |
| In ip group for location | LOCATION: from IP | rule.type.enum.location | If the IP is in the IP | {Group ID} |
| In range group for location | LOCATION from IP range | rule.type.enum.location | If the IP is in the IP range | {Group ID} |
| Multiple users using the same location | LOCATION: Max Users | rule.type.enum.location | Maximum number of users using the current ip | {Seconds elapsed} {The maximum number of |
| Not in ip group for | LOCATION: not in IP | rule.type.enum.location | If the IP is not in the IP | {List ID} |
| Not in range group for | LOCATION: not in IP | rule.type.enum.location | If the IP is not in the IP | {List ID} |
| IP in city | LOCATION: in City | rule.type.enum.location | If the IP is in the given | {Group ID} |
| IP in country | LOCATION: in Country | rule.type.enum.location | If the IP is in the given | {Group ID} |
| IP in state | LOCATION: in State | rule.type.enum.location | If the IP is in the given | {Group ID} |
| IP not in city | LOCATION: not in City | rule.type.enum.location | If the IP is not in the given | {Group ID} |
| IP not in country | LOCATION not in | rule.type.enum.location | If the IP is not in the given | {Group ID} |
| IP not in state | LOCATION: not in State | rule.type.enum.location | If the IP is not in the given | {Group ID} |

These data items are assembled from the location, device, and user criteria (as indicated in column 2). The user-type data items generally test whether or not a particular user's behavior suggests a likely malicious intent. The device-type data items generally test whether or not a particular device has been used and/or is being used in a manner that suggests it has been accessed by users with a likely malicious intent. For example, a device is suspect if it is one from which rejected login requests have originated in the past or which has been accessed by an unidentifiable or suspect user. These data items also include the Device ID or device fingerprint if available from the device. The location-type data items generally test the association of a device or a user with an IP address. For example, a user or device may be suspect if their requests originate from multiple IP addresses, or from new IP addresses, or the like.

Associated with a security model, such as the model of FIG. 15B or Table 7, are evaluation rules which, in an embodiment, provide a score reflecting the likelihood that a current request is a security problem. Tables 8 and 9 present exemplary security evaluation rules in the form of decision tables. The illustrated decision process is hierarchically arranged (or nested) such that the process of Table 8 invokes further checks (e.g., the checks of Table 9) if certain conditions are found.

TABLE 8

Primary device decision table

| Secure cookie | Flash cookie | Flash data | Browser characteristics | Operating system characteristics | Score |
|---|---|---|---|---|---|
| * | * | * | * | * | 0 |
| X | * | * | * | * | PATTERN CHECK |
| M | * | * | * | * | SECONDARY CHECK |

TABLE 8-continued

Primary device decision table

| Secure cookie | Flash cookie | Flash data | Browser characteristics | Operating system characteristics | Score |
|---|---|---|---|---|---|
| X/M | X | * | * | * | PATTERN CHECK |
| X/M | M | * | * | * | SECONDARY CHECK |
| X/M | X/M | X | * | * | PATTERN CHECK |
| X/M | X/M | M | * | * | SECONDARY CHECK |
| X/M | X/M | X/M | M | * | SECONDARY CHECK |
| X/M | X/M | X/M | X/M | M | 10 |

Key:
X = missing;
M = present and mismatched;
* = present and matched

The table above returns a score of "0" (a score indicating a low likelihood of fraud) if all evaluated data items are present and match in connection with a current user request. If no data item is present or if all data items do not match, a score of "10" (a score indicating a high likelihood of fraud) is returned. In a case where some data items are present and match while other data items are absent or do not match, this table invokes further checks. For example, if the retrieved data tokens that were previously stored on a device by this invention (e.g., a secure cookie, a Flash cookie, or Flash data) are not present, a further pattern check is performed. The pattern check examines the particulars of the pattern of the location and device criteria and assigns an appropriate score. If data contained in the data tokens does not match current location and device criteria, a further secondary check is performed.

The secondary check examines the particulars of how the data contained in a retrieved data token does not match the criteria associated with a current user request. Table 9 is an exemplary decision table which implements such a secondary check.

TABLE 9

Secondary device decision table
Secure Cookie Mismatch

| Prior Cookie (same device) Browser Characteristics | TRUE Operating System | ASN | ISP | IP | Location | Score |
|---|---|---|---|---|---|---|
| T | T | T | T | T | T | 0 |
| F | T | T | T | T | T | 5 |
| X | T | T | T | T | T | 5 |
| T | F | T | T | T | T | 10 |
| T | X | T | T | T | T | 0 |
| T | T | F | T | T | T | 10 |
| T | T | X | T | T | T | 0 |
| T | T | T | F | T | T | 5 |
| T | T | T | X | T | T | 0 |
| T | T | T | T | F | T | 5 |
| T | T | T | T | X | T | 0 |
| T | T | T | T | T | F | 5 |
| T | T | T | T | T | X | 0 |
| F | F | F | F | F | F | 10 |
| X | X | X | X | X | X | 10 |

KEY
T = True
F = False
X = Missing

In this table, ASN abbreviates "autonomous system number"; ISP abbreviates "Internet service provider"; and IP stands for IP address (all of which are well known in the communication arts). A preferred indication of message origin results from combining the message's ASN, ISP and IP (in contrast to, for example, only the IP address). If a secondary check is called for, for example, as a result of a secure cookie mismatch, the indicated data items are gathered, a score determined, and the score is returned to the primary decision table invoking the secondary checks. A single secondary check can be invoked by different primary decision tables and at different times.

Business policies generally include rules (referred to as "transaction rules") that evaluate parameters of individual in-session transactions for the likelihood of fraud or malicious intent. Accordingly, business policies are generally applicable during post-authentication and are generally specific to the field or to the business of the service provider and service provider application. For example, in a banking application, specific transaction rules can be directed to specific banking transactions, e.g. bill pay, transfer funds, and the like. Transaction models can be used in conjunction with a security rule, e.g. don't allow (or challenge user for) money transfer request from an international IP address. Business policies can be shared by different service providers in a particular field, or can be created and customized for a specific service provider.

For example, a particular banking service provider may have determined that certain transaction data indicates that the transaction should be restricted or rejected. Table 10 present exemplary rules that evaluate conditions that can indicate a transaction should be restricted, challenged or rejected.

TABLE 10

Restricted business policy model rules

Money transfer request is greater than a certain dollar amount
Money transfer request to and from a specific suspected fraud or an international account
Money transfer request of a certain dollar amount by a user who is logged in from another country
Bill payment to a non-merchant account is greater than certain dollar amount
Transaction from an un-registered device/location or frequently used fraud device/location. This could trigger a customer service request or challenge question or an out of band phone authentication Workflow policies contain models that evaluate groups or sequences of related transactions (e.g., a transaction requested by a particular user) that indicate expected behavior patterns. These rules are preferably based on either expectations for a typical user of a given class or on historical data describing a particular user. Conversely, rules in workflow policies can indicate unexpected behavior that may indicate malicious intent. For example, if a user routinely requests account transfers in a certain range, then a transfer far out of this range can indicate risk. Alternately, if a user routinely makes money transfers of amounts greater than an expected average, future transfers in the part range do not necessarily indicate risk, and appropriate rules can be advantageously relaxed for the user.

Table 11 presents examples of rules that indicate that a requested transaction may be fraudulent or malicious and should be restricted, challenged or rejected.

TABLE 11

Restricted workflow model rules

More than average number of transactions performed by the user.
This could be on a daily, weekly, monthly, quarterly and yearly basis
Other than the normal time of the day the user does his/her transactions
Other than normal day of the week or week of the month the user does his/her transactions
Irregular pattern for transaction type and dollar amount Further type of policies and models are applicable in situations where data from third party databases are used for evaluating risk. For example, relevant rules can block or restrict logins or transactions based on input from a third party database of black listed IP addresses. Additionally, relevant models can be based on fraud patterns or models available from external databases. Embodiments of the present invention maintain databases useful for evaluating transactions and provide methods for generating and simulating patterns of fraudulent behavior.

The sections above have described the structure of criteria, policies, and models. In operation, specific instances of these policies are created and filled in for specific devices, locations, users, requests, service providers, and the like, that become known during the course of providing fraud detection and authentication services. These are generically referred to herein as "external objects." To aid in providing easier customization of the fraud detection and authentication services of the present invention for individual service providers, the created instances are grouped together and evaluated (to the extent possible) as members of groups. The groups correspond to the particular criteria items and are linked to compatible models containing rules used to evaluate activity.

Figure 16A:
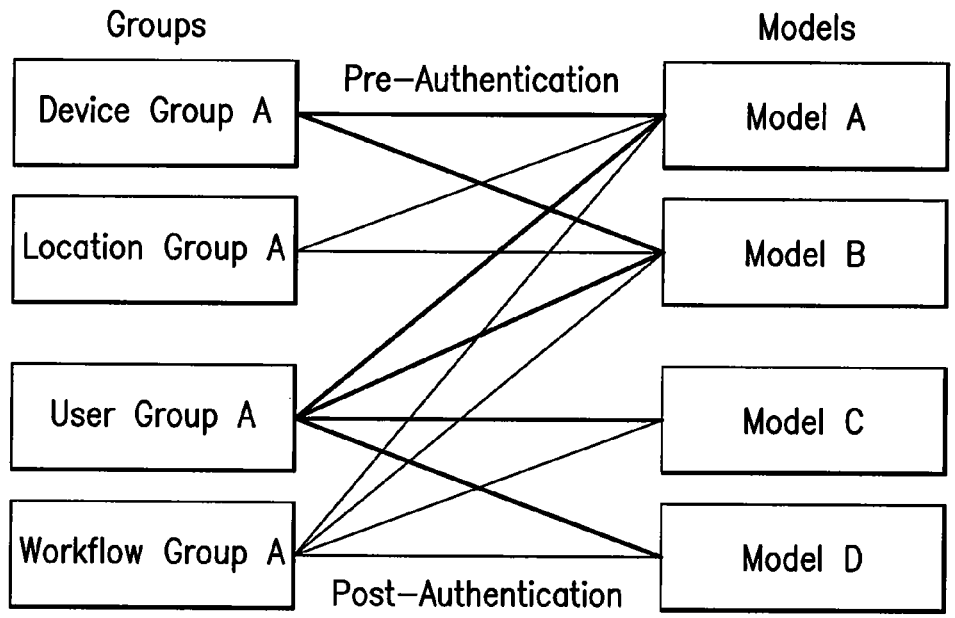
FIGS. 16A-16C are diagrams illustrate structures for external objects and models used in accordance with an embodiment of the present invention.
Figure 16B:
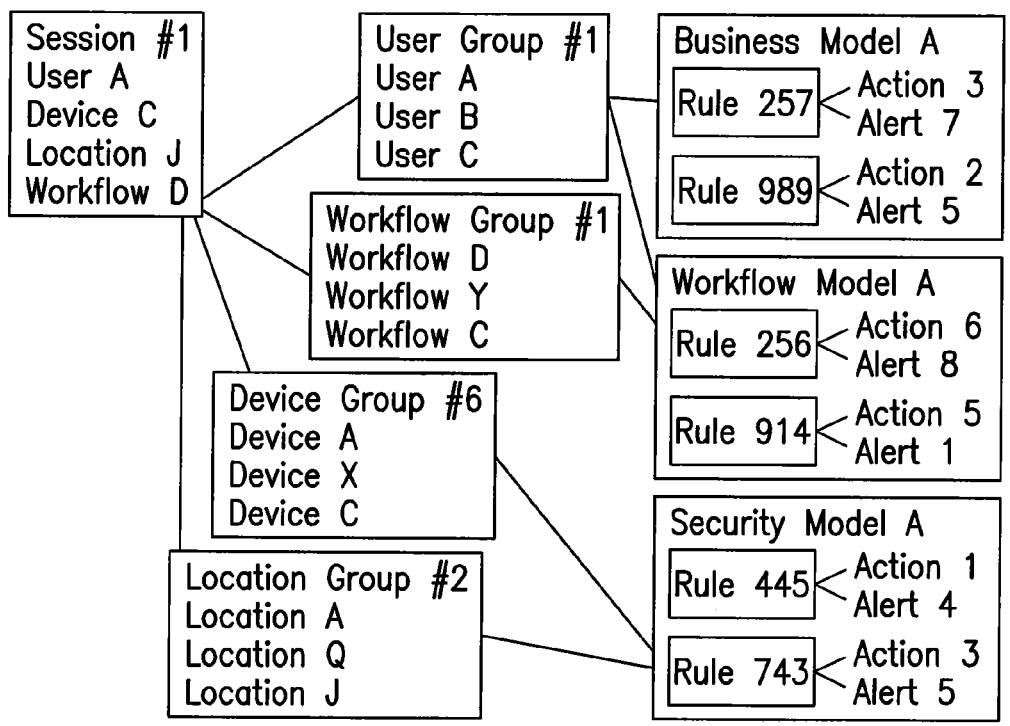
Figure 16C:
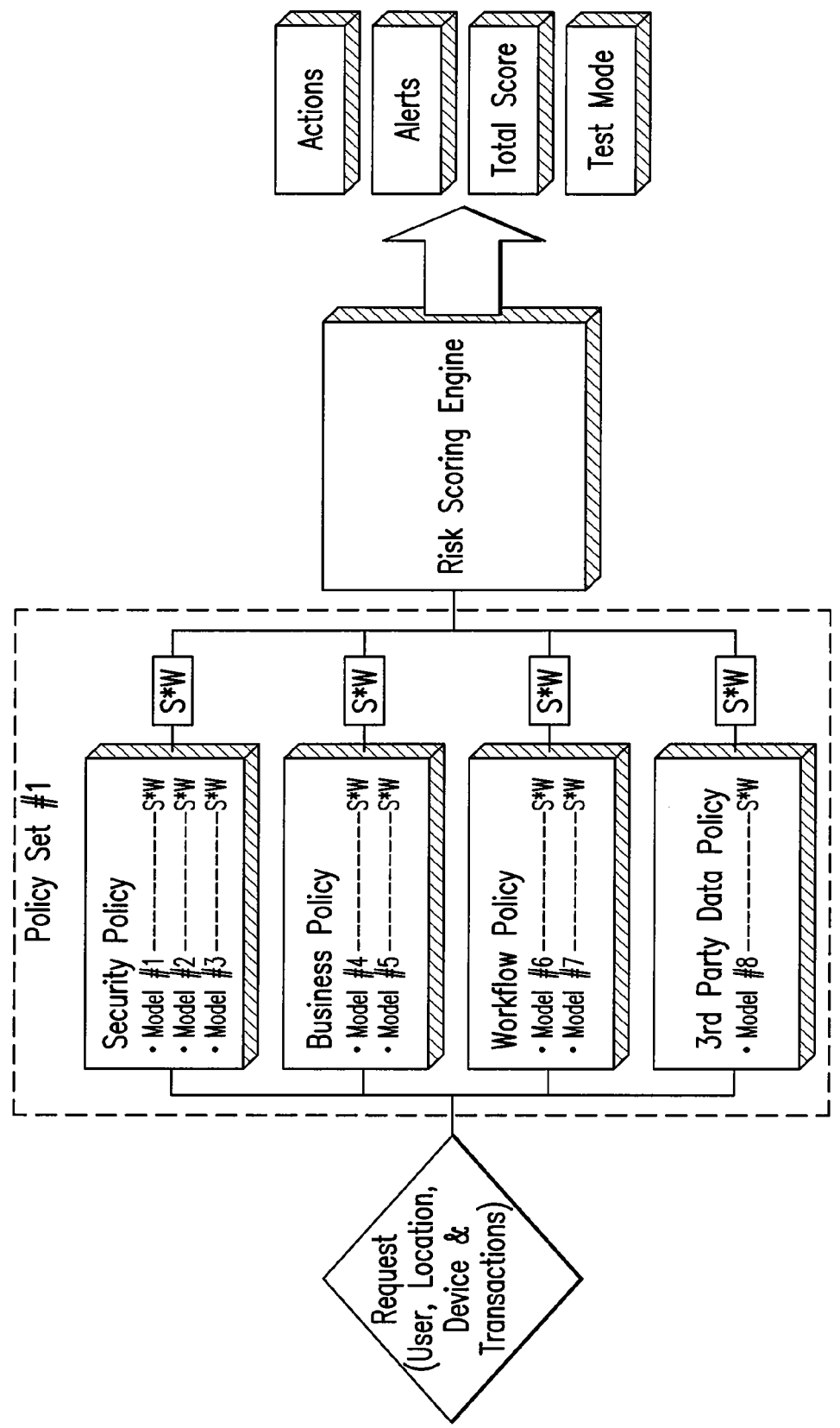
Figure 17A:
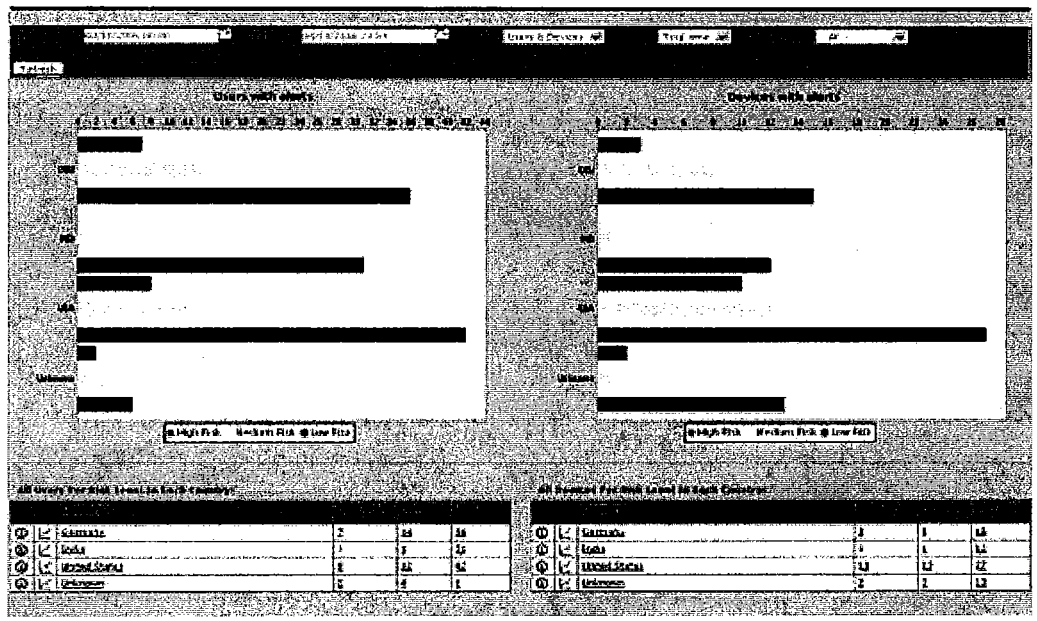
Figure 17B:
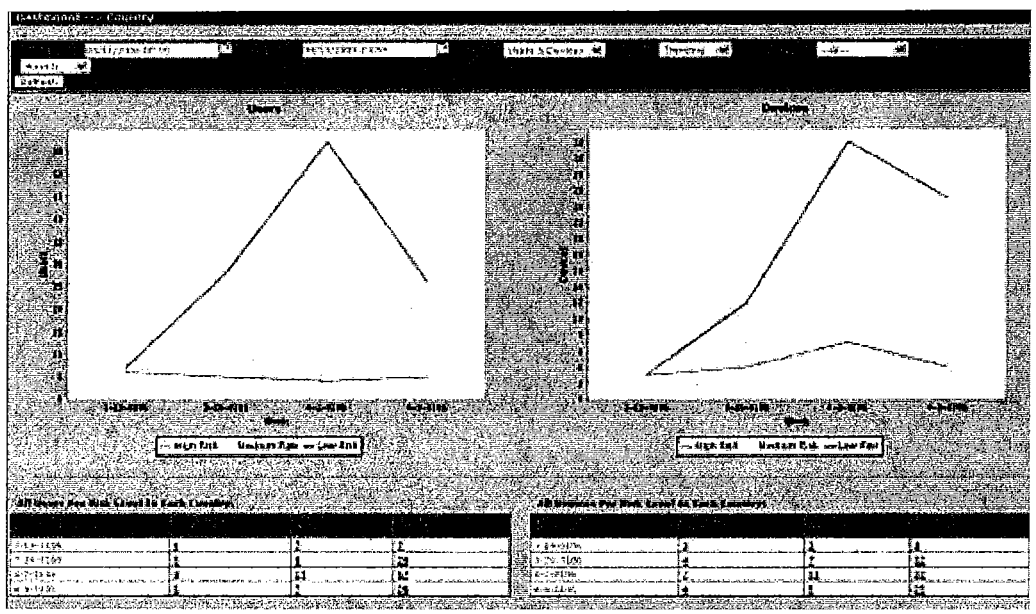
Figure 17C:
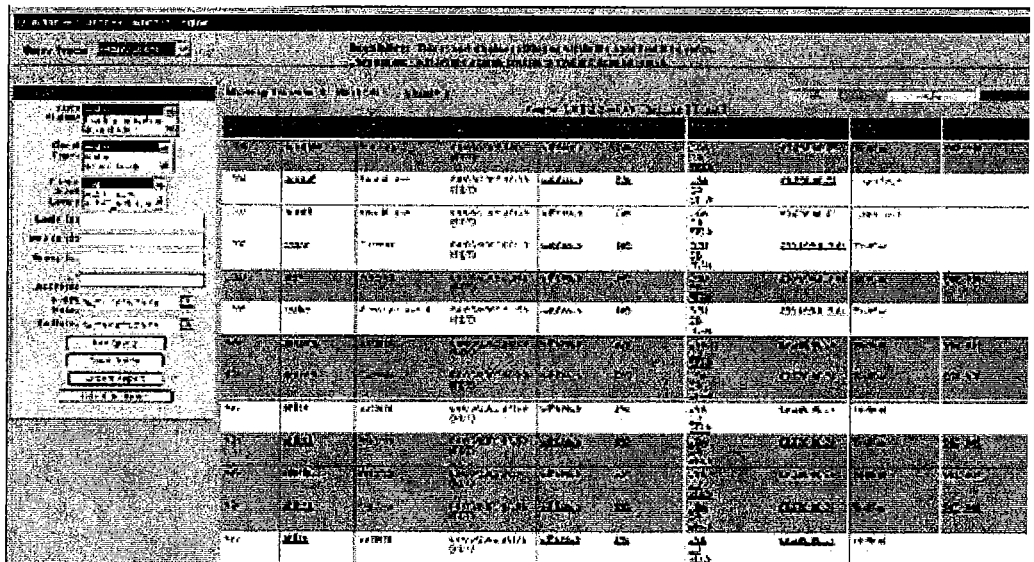
Figure 17D:
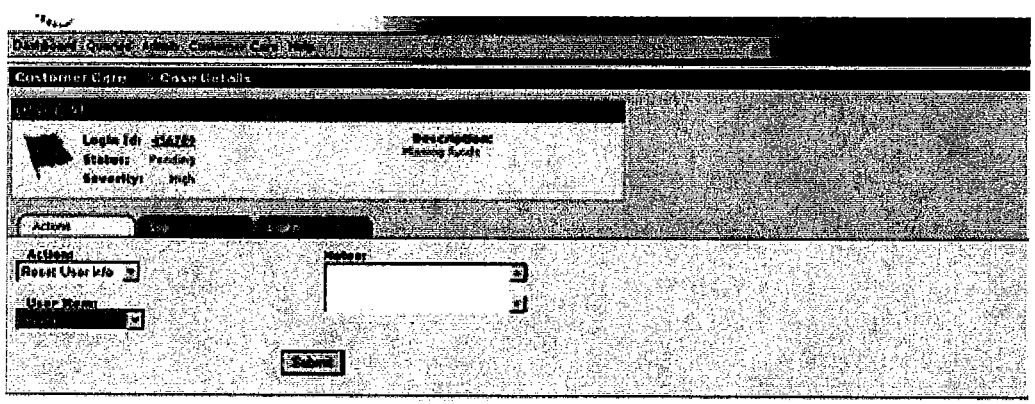

FIGS. 16A-16C are diagrams illustrating a model for linking external object groups and specific external objects to models specifying evaluation and action rules. A model is a collection of configured rules. A model contains any of number of rules. FIG. 16A illustrates that recognized devices, locations, users, and workflows are each assigned to certain respective groups of these objects. These groups of possible external objects are also linked to models that group related evaluation rules and strategies, for example, decision tables that emphasize selected data items. Different service providers can then select different ones of the linked models to be used for evaluating their requests. Also, different service providers can provide their own models (or direction for their creation) for linking to external object groups.

FIG. 16B is a diagram illustrating external object representations that might be created for user transactions submitted in a particular session. The illustrated session represents a particular workflow being submitted by a particular user at a particular device in a particular location. The particular user, device, location and workflow are instances of the illustrated groups of these respective external objects. These groups are linked to evaluation models containing evaluation rules. Preferably, the device and location groups are linked to one or more security model groups, while the user and workflow groups are linked to one or more business models and/or workflow models. The illustrated business models contain the indicated evaluation rules, which may cause the indicated action or alerts according to the circumstances. Optionally, models can be grouped into policy sets, which typically contain one model of each type. In this case, external objects can be linked to policy sets instead of to individual models.

A policy set holds all the policies, models and rule instances used to evaluate a total risk score. Multiple policy sets can be configured, tested, and stored, but in one set of embodiments only one policy set can be actually used at a time. Each policy set generally contains four types of policies (e.g., security policies, business policies, workflow policies, and third party policies), with each policy type representing models based on the type of policy.

FIG. 16C illustrates processing of a single request through this structure. Data defining an incoming request is used to update the models in the policy set associated with the request. These data updates can cause the risk/rules engine to be triggered. The risk/rules engine may then output an action, a risk alert, or a risk score as called for.

In more detail, the groups, models, and rules can be customized according to a business need, and can become activated if a transaction is scored above a certain risk threshold. Table 12 presents some exemplary rule types.

TABLE 12

Temporary allow/suspend rules

Per user basis
Single or multiple rules
Time or count based

Further, models can be nested to ensure a higher degree of accuracy for the risk score. A nested model is a secondary model used to further quantify the risk score, in instances where the original results output by the system are inconclusive. A nested model is run only when a specific sequence of answers is returned from the primary model. Nested models therefore reduce false positives and negatives and serve to ensure overall accuracy of the risk score. If a service provider does not wish to assign a risk score or nested model for particular criteria and data combinations, default weights are attached to each attribute. This further ameliorates customization requirements.

It will be apparent that this hierarchical structure is well suited to allowing easy customization; service providers need only specify the general goals for their fraud detection and authentication services while the particular details are hidden in system groups. It will be also apparent that this model is suited to implementation by object oriented programming techniques. The rules engine directs the gathering of criteria data, the creation of external objects, and the processing of rules.

In an embodiment, the rules engine (shown in FIG. 14) analyzes models and policies and their data elements in advance of their use. During authentication servicing, the rules engine triggers model processing when it recognizes pre-analyzed data elements that are relevant to a pre-analyzed service provider model. Transactional data flows identify those elements that may impact the models. After triggering, the models execute and provide risk scores, actions, and/or alerts if called for. New or changed parameters and data are maintained so that they can be tested when new data is next recognized or a model is next triggered. For example, if new data is within a certain range of old data, the associated model may not need to be triggered.

Table 13 presents one possible architecture for the rules engine.

TABLE 13

Rules Engine Architecture

Expert core
Interface
Semantic framework
XML/Native/XLS adapters

In preferred embodiments, the rules engine provides external interfaces structured by known formatting languages and conventions. Methods contained in the expert cores are designed to allow service providers to accurately recognized likely fraud and malicious intent.

In more detail, the following are examples of core methods. One method is known as "time over threshold." This method compares the value of a variable to a pre-defined threshold at each transaction and reports if the value has been out of range for too many transactions. Thus, rather than triggering a model each time the threshold is crossed, recent historical data is used to sort out persistent problems. Thus, time over threshold eliminates unnecessary alert and actions. Another exemplary method is known as "deviation from normal." This method, instead of comparing current actions to fixed thresholds, uses historical data to establish a "baseline" for specific days, times, users, devices, workflows, submitted data, and/or the like. It then assesses whether the current behavior is deviating from what is considered normal in similar circumstances.

Another method is known as "event state." This method maintains states for external objects which store past alerts and actions. Then, a failing rule generates a single alert on the first failure. Subsequent failures will not generate additional alerts until a selected interval has passed from the first alerts. If the rule subsequently succeeds, the alert will be cleared. Another method is known as "event rate." This method generates alerts only after a selected event has occurred too many times in a selected time interval. For example, if a login failure occurs more than three times in one hour, an alarm or alert is generated indicating that an intruder may be trying to access the system. However, subsequent login failures during the predetermined time period will not generate additional alarms, nor will less than three login failures. A further method is known as "event time over threshold." This method generates an alert when the rate of traps received exceeds a threshold rate for a period of time. For example, network links frequently go up and down, so it is distracting if an alarm is generated every time a link cycles. However, if the network link has failed for, for example, ten or more minutes in an hour, then availability may be is impacted and an alert is generated.

Software Configurations

The various components used in embodiments of the present invention, which have been briefly described above, are now described in more detail. These include the fingerprint process (described with reference to FIG. 4A), the FAAS process (described with reference to FIGS. 5 and 6), the Authenticator process (described with reference to FIGS. 7-10), the DCR server (described with reference to FIG. 11), and the FDM process (described with reference to FIG. 12). User devices are preferably identified using secure cookies, Flash cookies, and/or similar data tokens combined with other data items such as web browser characteristics, device hardware configuration (e.g., as acquired using Flash calls), network characteristics, and the like. Device identifying data is evaluated by a configurable set of nested rules that identify a device and also check historical logins from this device for accuracy, including handling exception cases where cookies are disabled, out-of-sync cookies, and also potentially identifying fraudulently stolen cookies.

Figure 4A:
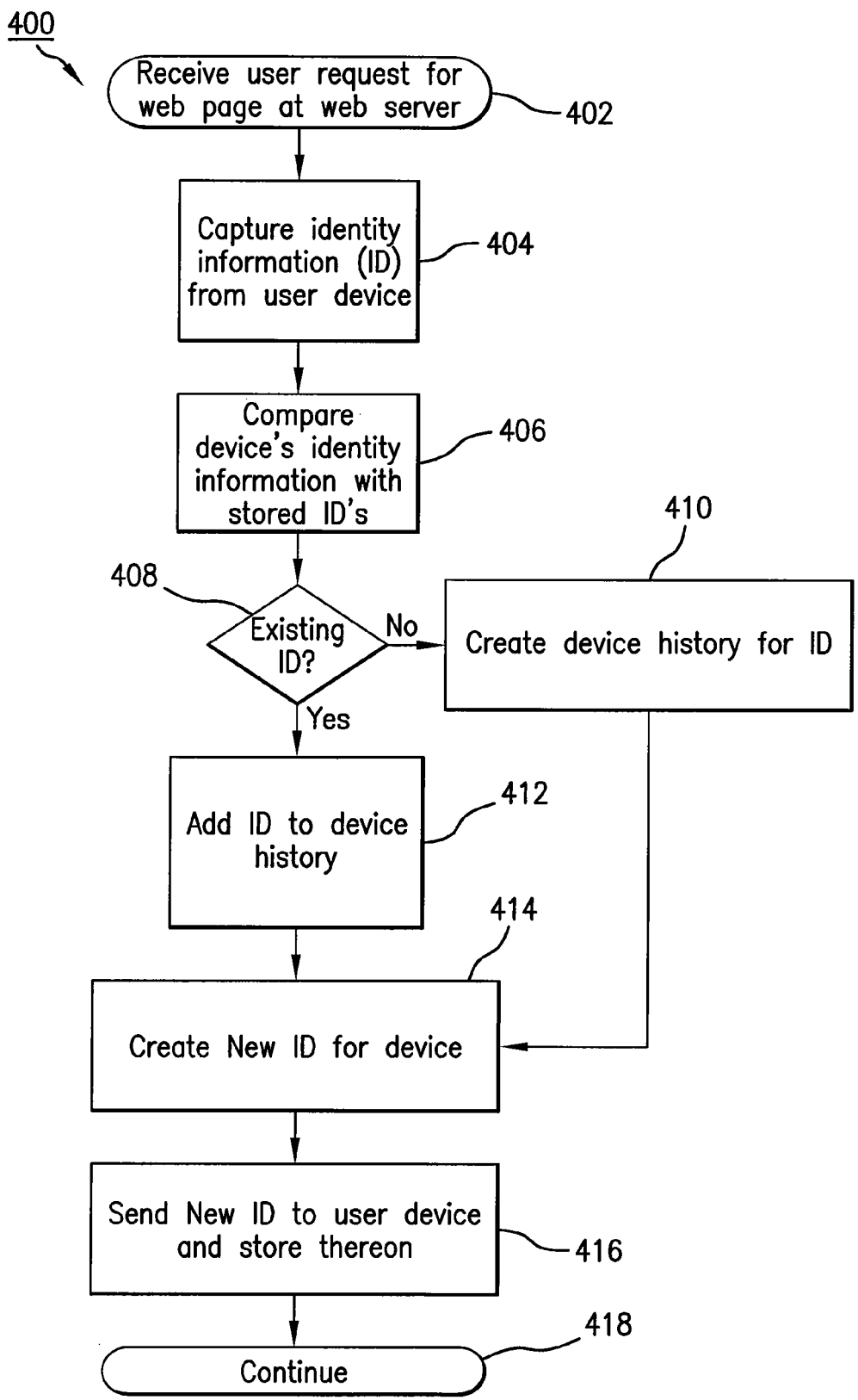
FIGS. 4A and 4B are flowcharts illustrating steps performed in fingerprinting a user device in accordance with an embodiment of the present invention.
Figure 4B:
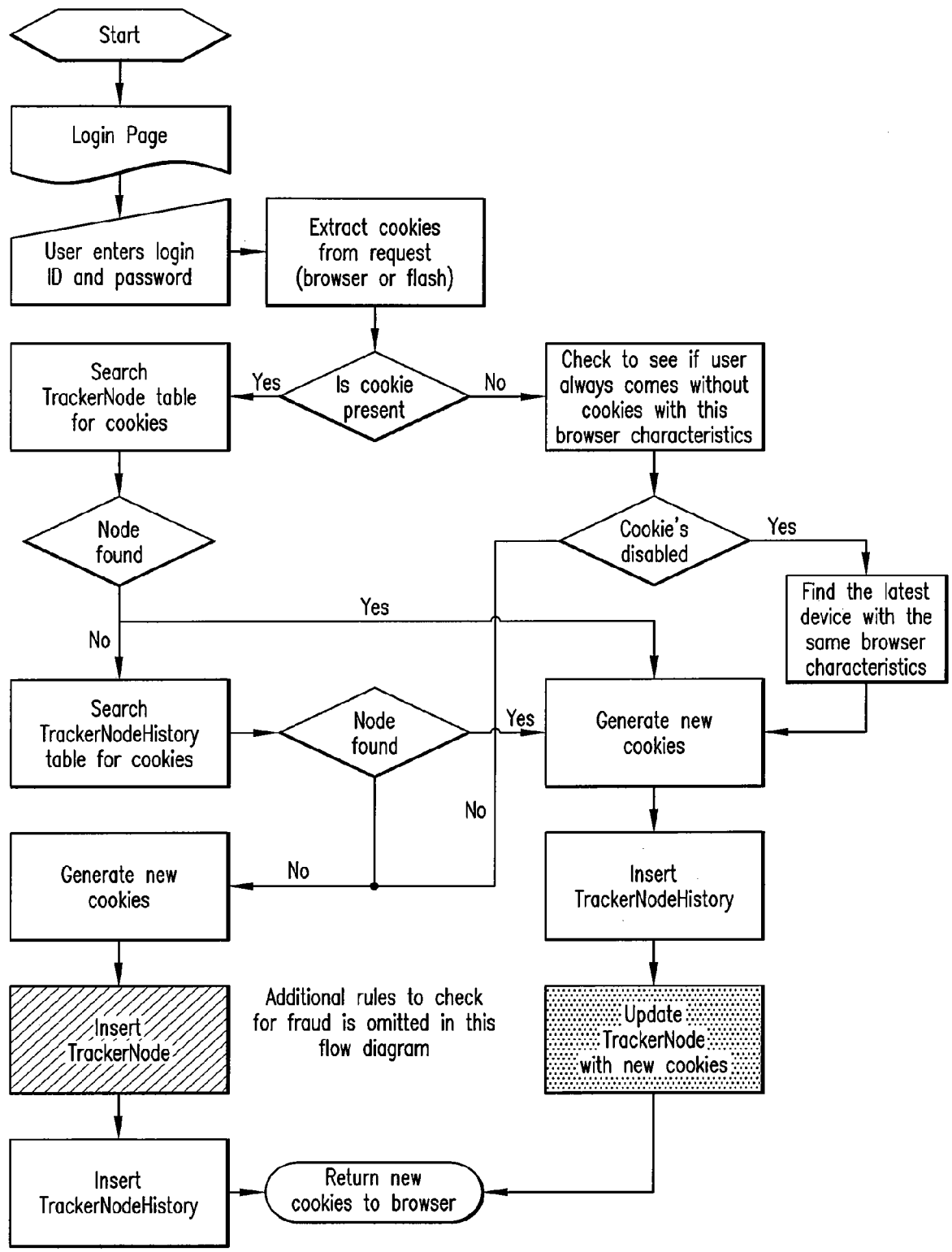

FIGS. 4A and 4B are flowcharts illustrating steps performed by device fingerprinting process 400 in accordance with an embodiment of the present invention. FIG. 4A presents a more general view of device fingerprinting, while FIG. 4B is a refinement of FIG. 4A presenting a more detailed view of a specific embodiment of device fingerprinting. This description will refer primarily to FIG. 4A; similar steps in FIG. 4B will be readily apparent. At step 402, a request is received at a service provider server from a user device 720 (FIG. 13A), for example, for data resident thereon. The fingerprinting process is invoked and information describing the request is transferred. The user device may be a personal computer 720 as in FIG. 13A, a cell phone, personal data assistant (PDA), automated teller machine (ATM), or other suitable device capable of accessing a server. Preferably, the service provider server is a web server accessible from the user device via the Internet, or other public network, or a private network.

At step 404, device identity information for the user device is captured. This information can be captured by a client program already resident on the user device. For Internet applications, the client program is commonly a web browser. Alternatively, a software module can be downloaded to the user device and executed to gather identifying information. For Internet applications, the software module can be a plug-in, a script, or an applet (e.g., a Java applet) downloaded by the web browser and executed. The identity information gathered is selected to identify the user device as uniquely as possible. Preferably, the device can be uniquely identified within those user devices that access the server application. If insufficient information is available for unique identification, the user device is identified as narrowly as possible (e.g., by the values of specific properties that vary widely among possible user devices). Identity information can be augmented by data generated by the fingerprinting process itself (e.g., a unique bit string, such as a large random number). Some or all of the device identity (along with identifying information generated by the fingerprinting process) information is stored in a data token referred to as a Device ID.

Generally, the captured device identifying information includes a secure, persistent data token that has been previously stored on the user device. Secure persistent data generally includes data elements that are encrypted, signed, or otherwise secured against modification, and that remain resident on the user device even when it is not accessing a service provider application. This data may have been previously stored on the user device by the service provider application, in which case it often identifies the user who accessed the service provider. This data may also have been stored by the fingerprinting processes of the present invention during the course of a prior identification of this device, in which case, it preferably includes the Device ID.

Although any technique that allows a remote application to store and retrieve persistent data on a user device can be used, it is preferred to use known and widely available techniques. One such technique is known as "secure cookies." A standard cookie is a data packet sent by a web server to a web browser for saving to a file on the host machine. The data packet can be retrieved and transmitted back to the server when requested, such as whenever the browser makes additional requests from the server. A secure cookie refers to a standard cookie that has been secured against modification or tampering.

Another such technique is known as "flash cookies." Graphical software applications and/or plug-ins from Macromedia, and generally identified by the trade name "Flash," are currently resident on many user devices. This software can create local shared objects, known as "flash cookies," for maintaining locally persistent data on a user's device akin to the standard "cookies" stored by web browsers. Flash cookies can be stored locally on a flash plug-in user's device, are updatable, and have the advantage of not being as easily removed from the user's device as standard cookies.

A second type of device identifying information are the hardware characteristics of the user device and/or of the user device's network connections. Many types of hardware characteristics can be gathered for device identifying purposes, including IP addresses, adapter MAC addresses, local time and/or time zone, network connection speed such as download and/or upload times, microprocessor type and/or processing and/or serial number, and the like.

Figure 6:
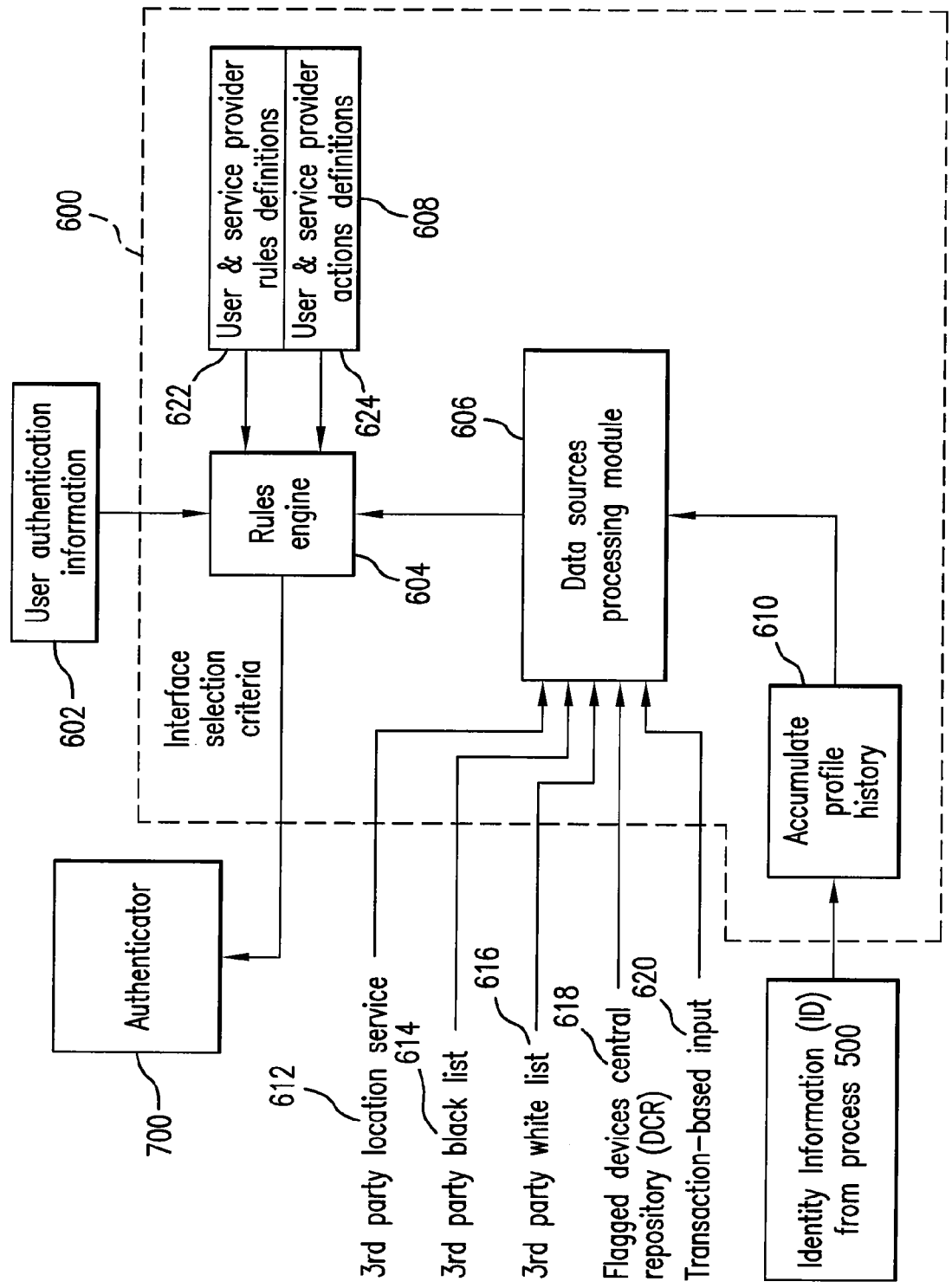
FIG. 6 is a simplified block diagram illustrating components of a Fraud Analyzer and Alert System (FAAS) in accordance with an embodiment of the present invention.

At step 406, the captured device identity information (ID), including any previously stored Device ID, is compared to identity information that has been previously stored by the FAAS process in a database referred to as a "device/profile history" (see 610 of FIG. 6 where the device/profile history is referred to as a "profile history"). The device history/profile database includes record(s) associated with and describing previously recognized and/or identified devices. If it can be established that the captured device information corresponds to information previously stored for a device (test 408), the new identifying information updates the device history record for the device at step 412. One test comprises matching a unique bit string previously generated by the fingerprint and stored on the user device and in the device history. If no corresponding record in the device history database is found during test 408, then a new record is created with the new identity at step 410.

Lastly, a new Device ID token is created for the device at step 414, and at step 416 the Device ID token is sent to the user device and stored thereon (e.g., as a standard cookie or as a Flash cookie). If no Device ID was found on the user device, a new Device ID token is created from the gathered identifying information. If a Device ID was found, it can be updated (e.g., with a new unique bit string, new timestamp, and/or the like). At step 418, the process continues.

One feature of the present invention relates to the replacement of the cookie on the user's machine upon each login. This provides further security so that even if a user's machine information is improperly acquired by a third party (including the device information embodied in a previous stored cookie), the authentication system can identify that the user is not authorized and deny access to the system. Of course, access by a different computer often occurs for certain users, and secondary security protocols can be provided to allow access to authorized users. In addition, if access is allowed for a user on a different computer, this can be identified by the software with an implementation of a higher risk of security when the user tries to access applications or other files in the system. Cookies, and device token generally, are also stored for comparison with the token when later retrieved. Thus, stolen fingerprints, tokens, or Device IDs cannot be fraudulently reused.

Figure 5:
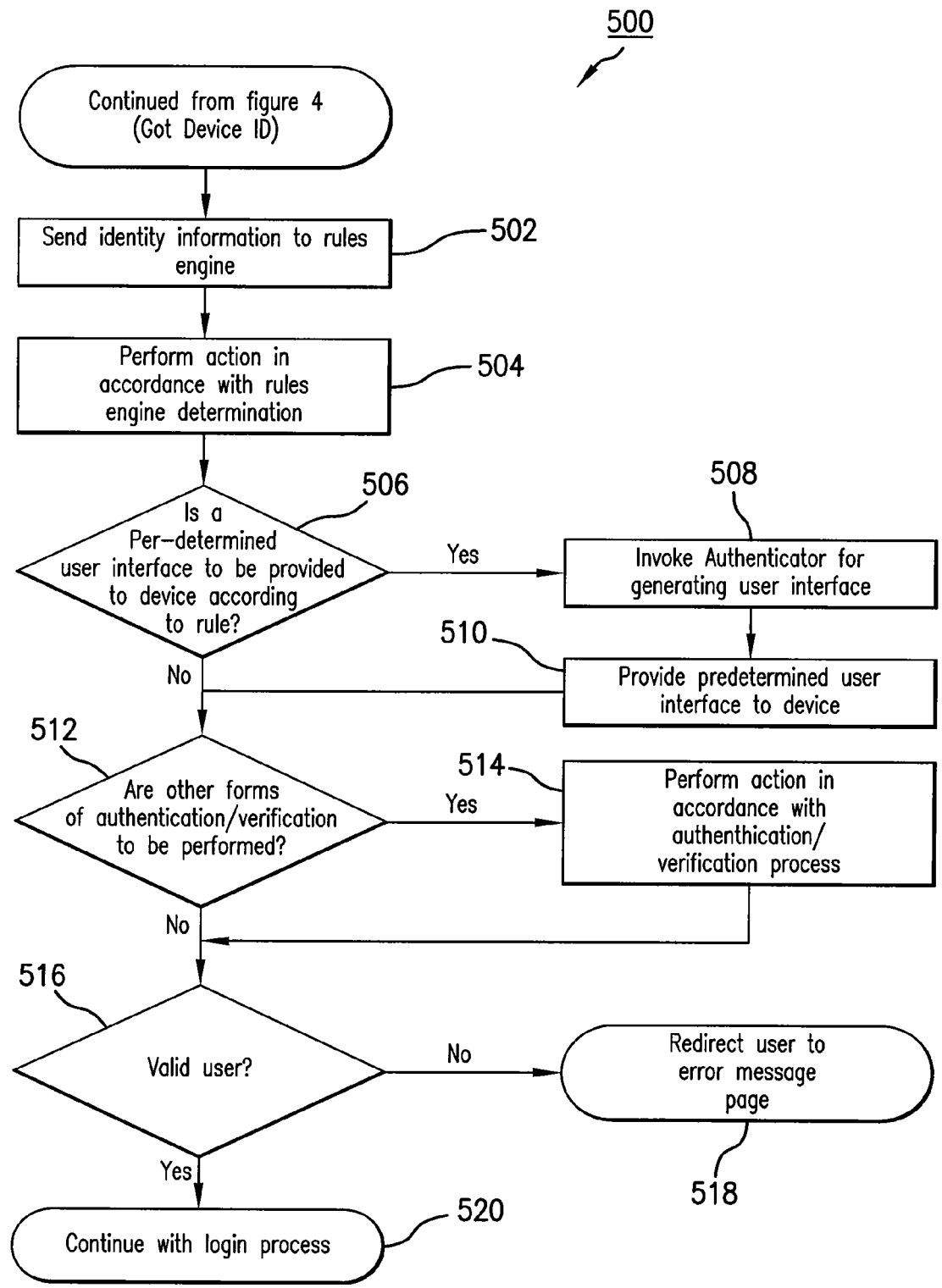
FIG. 5 is a flowchart illustrating steps performed in authenticating a user in accordance with an embodiment of the present invention.

The fraud analyzer and alert system (FAAS) process, which is invoked by the fingerprinting process, is described with reference to FIG. 5, illustrating an exemplary flowchart for this process, and with reference to FIG. 6, illustrating an exemplary implementation of this process. Generally, the function of the FAAS is to represent the user's and service provider's instructions concerning how best to carry out authentication in view of risk information relating to the device making an access request and optionally in view of the nature of the request. In one set of embodiments, the user's and service provider's instructions are represented by rules. A rules engine component of the FAAS evaluates access requests in view of available fraud risk information in order to determine authentication interface selection criteria. In alternative embodiments, other techniques can be used to evaluate access requests and to determine interface selection criteria. For example, the rules and rules engine can be replaced by statistical analysis techniques, neural network techniques, and so forth. See, e.g., Duda et al., *Pattern Classification*, Wiley-Interscience, 2nd ed., 2000.

Turning to FIG. 6, FAAS 600 is illustrated and described with reference to its inputs, outputs, internal data structures, and processing components. Most external inputs are processed by the data sources processing module 606. This module receives external data and formats and/or otherwise prepares it for use by the rules engine 604. One external input is the device identifying information just gathered by the fingerprinting process 500 concerning the device from which the current access request originates. This gathered information preferably includes (and/or is encapsulated in) the Device ID, and also can include IP addresses, secure and Flash cookies, CPU type, etc. This identifying information is used to cross reference the device/profile history database 610 in order to determine if the current device has previously accessed the service provider application/system. If so, information stored therein and associated with the current device (e.g., risk information) is retrieved and input to the data sources processing module. The device/profile database is updated with the current identifying information. Where a device cannot be uniquely identified, this information refers to a group of similar devices including the current device.

Another external input to the data sources processing module from the service provider application/system is transaction-based input 620. Transaction-based input 620 comprises input regarding the specific transaction being requested by a user device (e.g., purchase amount, transfer amount, type of transfer requested, etc.) for which a service provider or user may wish to handle specially by storing a rule in rules definition module 608. For example, the service provider may wish to receive an alert and/or invoke a higher security authentication interface before purchase requests over a certain amount are sent to the server. Generally speaking, transaction-based input 620 may include any type of data submitted by the user to the service provider application.

Another external input to the data sources processing module is from a DCR 618. DCR 618 is a database of historical fraud risk information derived from the service provider and preferably also from other service providers. The information is derived from the fingerprinting and FAAS processes.

The data sources processing modules also preferably receives data from external third-party data providers. These sources can include geolocation service 612, black list service 614, white list service 616, and the like. Geolocation service 612 provides approximate geographic latitude and longitude corresponding to a user device IP address. Geolocation by IP address is a technique of determining the geographic latitude and longitude corresponding to a user by comparing the user's IP address with known locations of other nearby servers and routers. The third party black list service 614 typically provides a list containing IP addresses of suspected fraudulent users (e.g., addresses associated with suspected or known fraudulent activity). The third party white list service 616 typically provides a list of IP addresses that have a history of being legitimate (i.e., not associated with fraud).

FAAS processing is preferably performed by rules engine 604. This rules engine can be constructed to use a predetermined set of rules to determine authentication interface selection criteria. The data sources processing module is coupled to the rules engine in order to make external data readily available. The rules definition module 608 is coupled to the rules engine in order to provide stored rules and actions. Rules are stored in component 622 of the rules definition module, and actions associated with the rules are stored in storage 624. Rules can be supplied and stored by a service provider so that authentication actions can be tailored to the service provider's requirements. Service provider application 1322 can optionally also have a direct link to the rules engine so that so that the rules engine can request additional authentication guidance from the service provider application.

An exemplary action is to specify a particular authentication interface selection. For example, a rule may specify that if there is receipt of a request from a user device for a transfer of an amount of money over a certain threshold, and if the device resides in a location (determined, e.g., by geolocation) known for an larger than normal volume of fraudulent activity, the action to be taken is to present a predetermined higher security user interface to the user in order to provide more security against a possible fraudulent transaction.

The rules engine evaluates its input data (and input guidance, if any) according to the stored rules and determines interface selection criteria according to the stored actions. The interface selection criteria specify the type of authentication interface that should be displayed to the user at the current user device in order to authenticate the current access request. These criteria can, in some embodiments, specify the specific interface to be displayed, or can, in other embodiments, specify interface characteristics, such as level of security. The interface selection criteria are output to Authenticator 700, which selects and displays the authentication interface to the user. The user then enters the requested authentication information and/or performs the requested authentication actions (if any). This entered information (known as "user authentication information") is returned to the FAAS and/or to the service provider application and the rules engine. Either the rules engine, or the service provider application, or both together, evaluate the user authentication information to determine whether or nor the user is authenticated. Optionally, a degree of authentication can be determined. If the degree of authentication is insufficient, the service provider application may then request the FAAS to perform further authentication(s).

FIG. 5 is a flowchart illustrating steps performed by the FAAS process. FAAS processing is invoked when it receives device identification data, e.g., a Device ID, captured from a user device by the fingerprinting process. Additional data can be retrieved from third party providers. Identity and risk information is then evaluated (step 504) by the rules engine to determine whether or not a predetermined/preselected user interface is to be provided to the current device from which the user request originates. If so, Authenticator function 700 is invoked (step 508) to generate the user interface, preferably a graphical interface, according to the interface selection criteria, and then present the interface to the device (step 510).

The rules engine then evaluates the returned user authentication information to further determine (step 512) whether or not other forms of authentication or verification are needed. Additional authentication, if needed, is performed at step 514 in accordance with the rules specified by the service provider.

Next, the rules engine and/or service provider application, based on the received authentication information (e.g., username and password) entered by the user, decides whether or not to authenticate the user as valid. If the user is valid, the login process is continued at the service provider application (step 520). If the user is not valid, the user is directed to an error message (step 518). Typically, the service provider then blocks user access to the application and terminates the session connection. Alternatively, the service provider may give the user additional opportunities to present valid user authentication information.

It should be appreciated that the service provider might not give the user an opportunity to use the user entry interface to input authentication information for validation. For example, if, based on the Device ID information, the user device is identified as posing a major risk of fraud, embodiments of the present invention enable the service provider to require via a rule that a fraud alert be sent to the service provider. The service provider may then respond by terminating the user's connection to the server before enabling entry of the user's authentication information via a user interface. The selection criteria for the initial user interface for display may be predetermined by the service provider.

It should also be appreciated that the user or service provider may request further authentication during the course of a valid already-authenticated session based on, for example, the transaction being requested. For example, a bank or other financial institution may wish to invoke a higher security authentication interface during a session before transactions over a certain amount are sent to the server, or when specific data submitted by the user is determined to pose a risk of fraud. Embodiments of the present invention can be invoked to provide for such authentication.

User Interface Management

Figure 7:
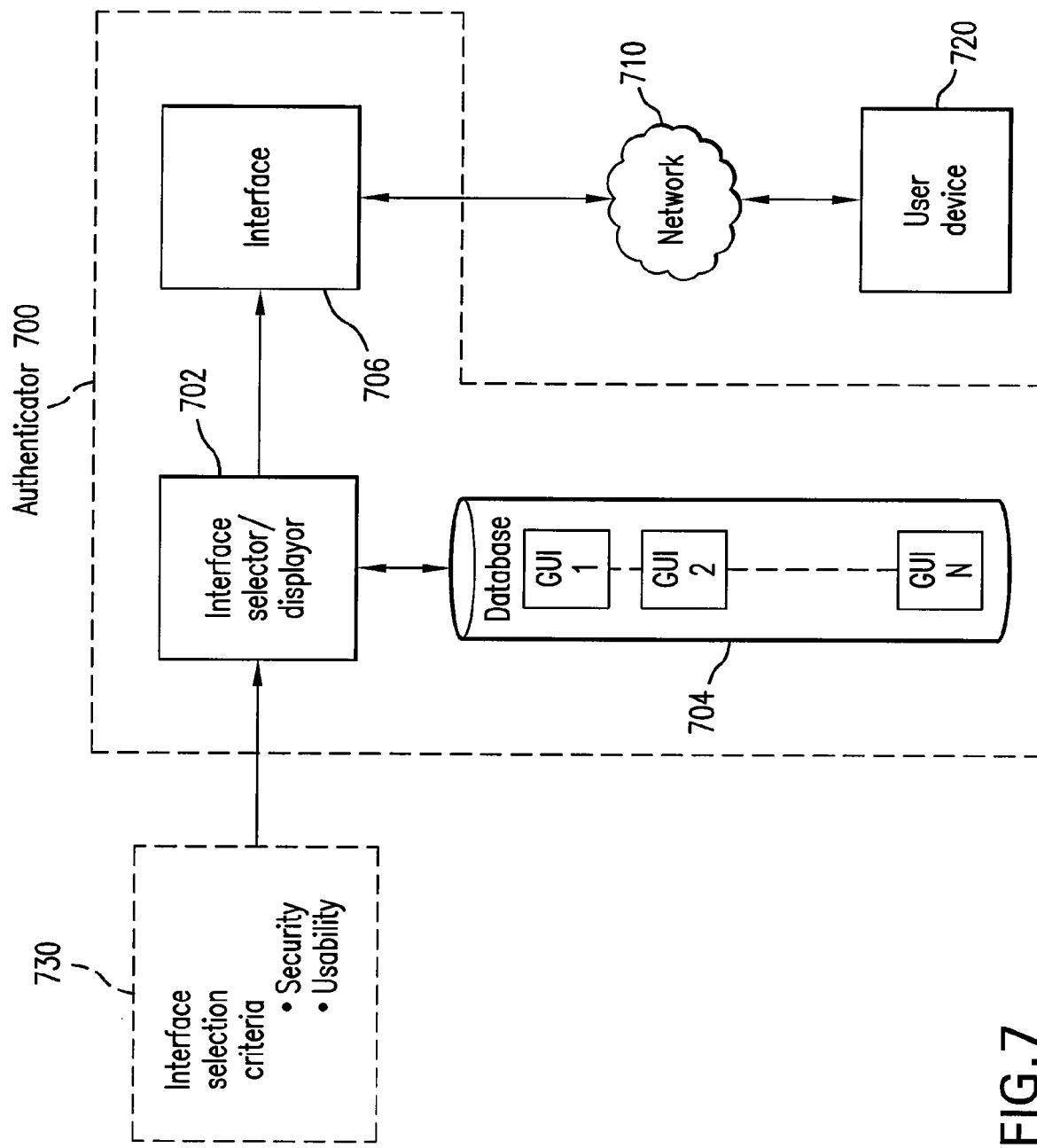
FIG. 7 is a simplified block diagram illustrating components of an Authenticator in accordance with an embodiment of the present invention.

FIG. 7 is a simplified block diagram illustrating authenticator 700. In an embodiment, authenticator 700 presents a selected authentication interface to a user device 720 via network 710 as a function of interface selection criteria 730 (as determined by the FAAS). The selection criteria may include a plurality of usability and security factors. For example, the service provider or the user/subscriber to the service provider may request a heightened authentication interface for certain types of transactions perceived to have heightened risk of fraud. This can be reflected in rules specific to the service provider, or to a particular user, or to a particular transaction type.

The present invention can address usability concerns by providing selectable, multiple tiers of graphical authentication user interfaces, ranging from a basic familiar user interface to the most secure user interface, with a plurality of interfaces in between. For example, a more user-friendly interface can be presented for routine transactions to long-term users who are using a device that does not present a known risk of fraud. In the latter case, a rule can be created for that user and included as part of the definitions module 608 of FIG. 6. Also, certain users may be permitted to add rules to tailor their authentication interfaces.

In more detail, interface selection criteria 730 are received by an interface selector/displayor 702 in Authenticator 700. An interface module 706 and a database 704 are coupled to the interface selector/displayor 702. The database 704 comprises a plurality of graphical user interfaces (GUIs), shown as "GUI 1" to "GUI N." A selected one of the GUIs is sent to interface module 706 by the interface selector/displayor 702 as a function of the interface selection criteria 730. The interface module 706 sends the selected GUI to user device 720 via network 710. Optionally, the interface selection criteria can specify that the selected GUI be modified in a particular fashion. Entered user authentication information is returned to the FAAS and/or to the service provider.

Figure 1:
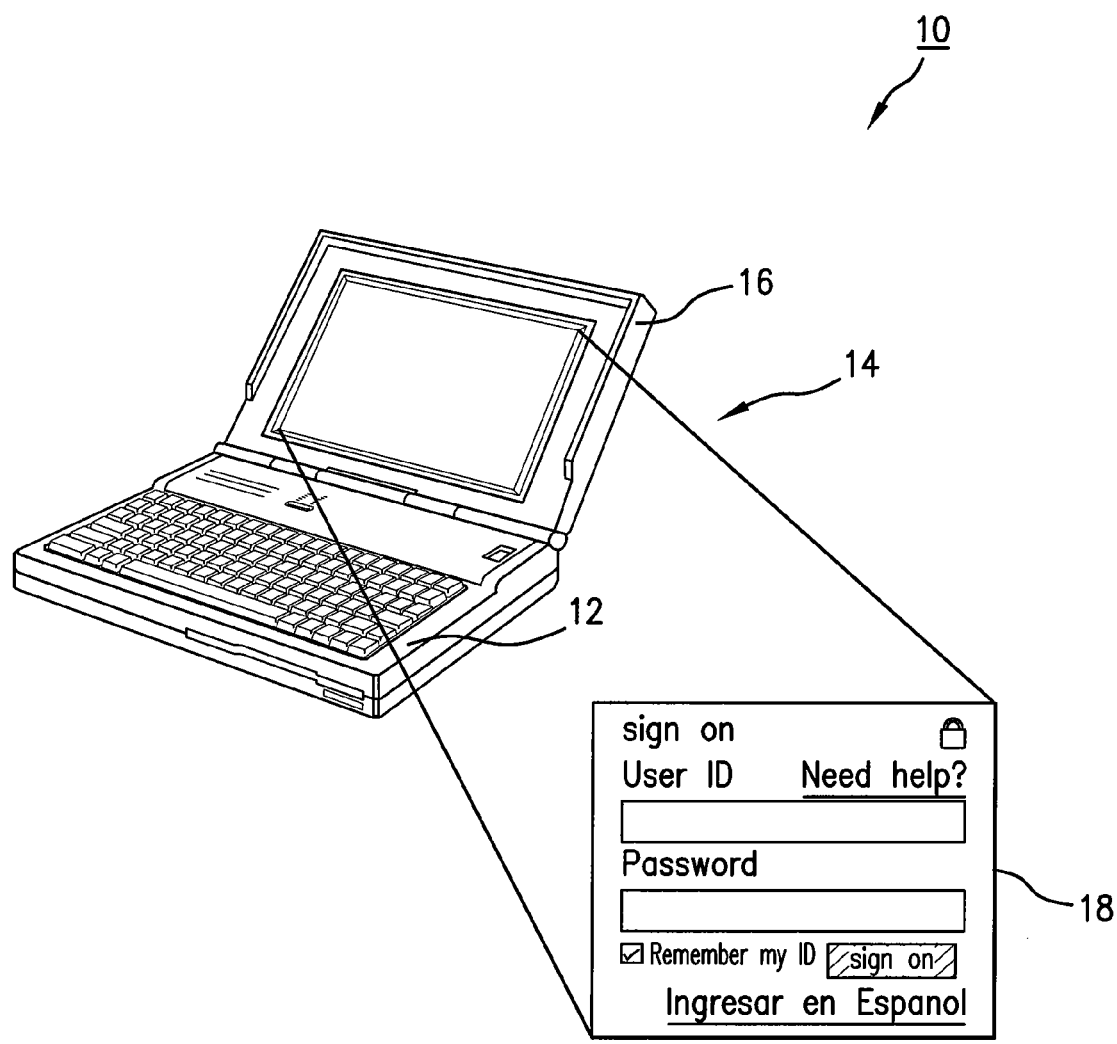
FIG. 1 is a diagram illustrating an exemplary prior art system used for entering user authentication information.
Figure 2:
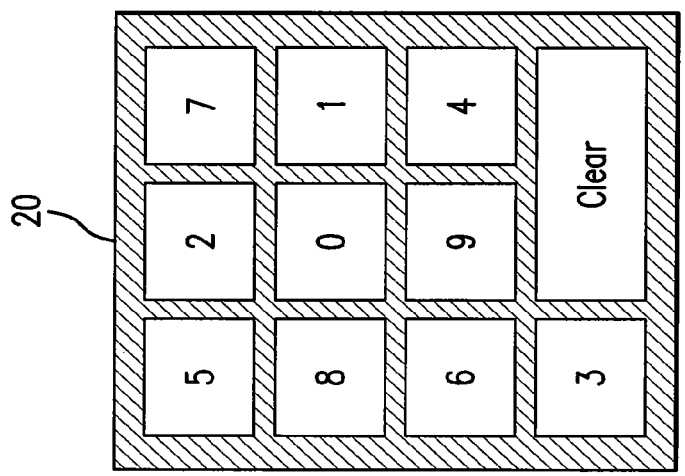
FIG. 2 illustrates a prior art keypad graphical user interface for enabling entry of authentication information via mouse click selections.

Database 704 can include user interfaces such as interface 18 shown in FIG. 1 and the interfaces shown in FIGS. 2, 3, 8, and 9 and variations thereof (e.g., FIGS. 1A-10E illustrate a plurality of higher security interfaces based on the keypad user interface of FIG. 2). Although the user interfaces are shown with two authentication factors—user ID or username and password—it should be appreciated that the present invention is not limited to two factors; additional factors may be included within the scope of the present invention. Each of the GUIs shown is sent to the user device using suitable software (e.g., MACROMEDIA Flash, Java, etc.). In one set of embodiments, Flash software is used for the GUIs.

Figure 8:
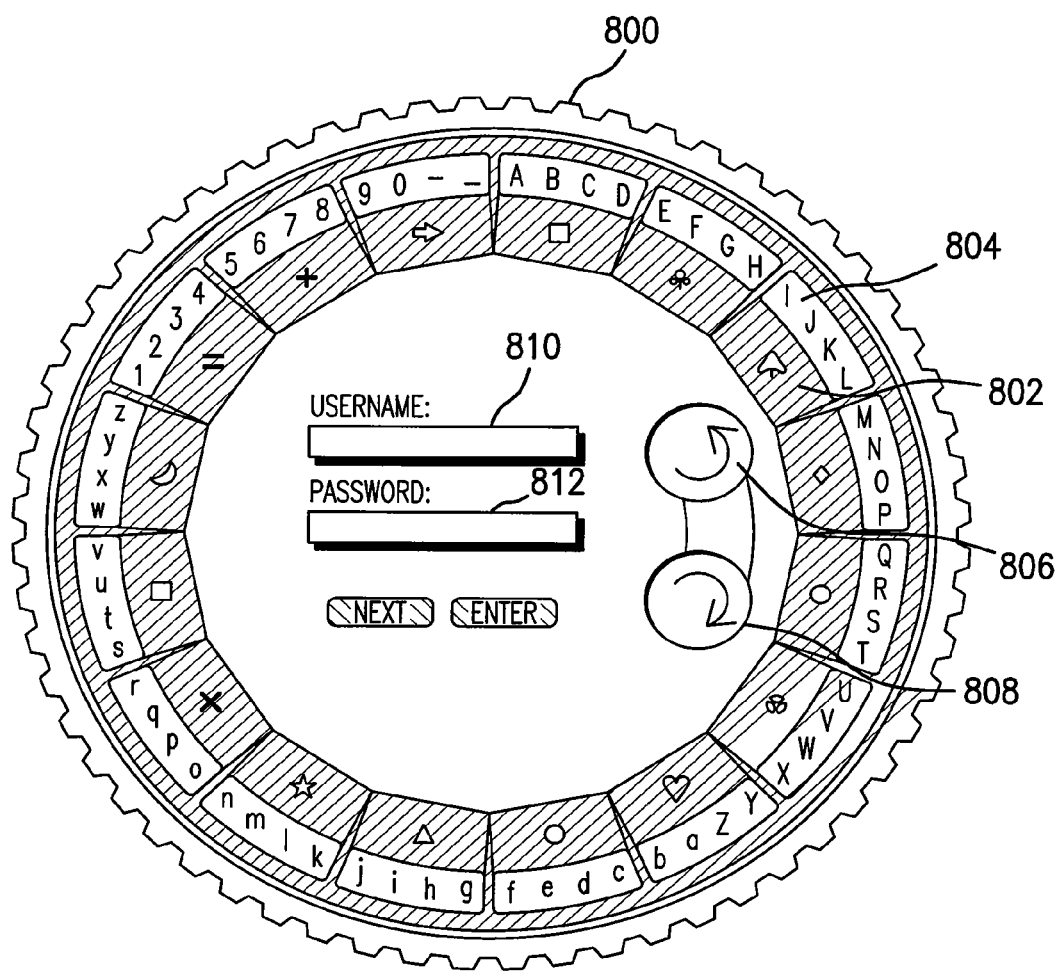
FIG. 8 illustrates a graphical wheel-based authentication interface that may be used with embodiments of the present invention.
Figure 9:
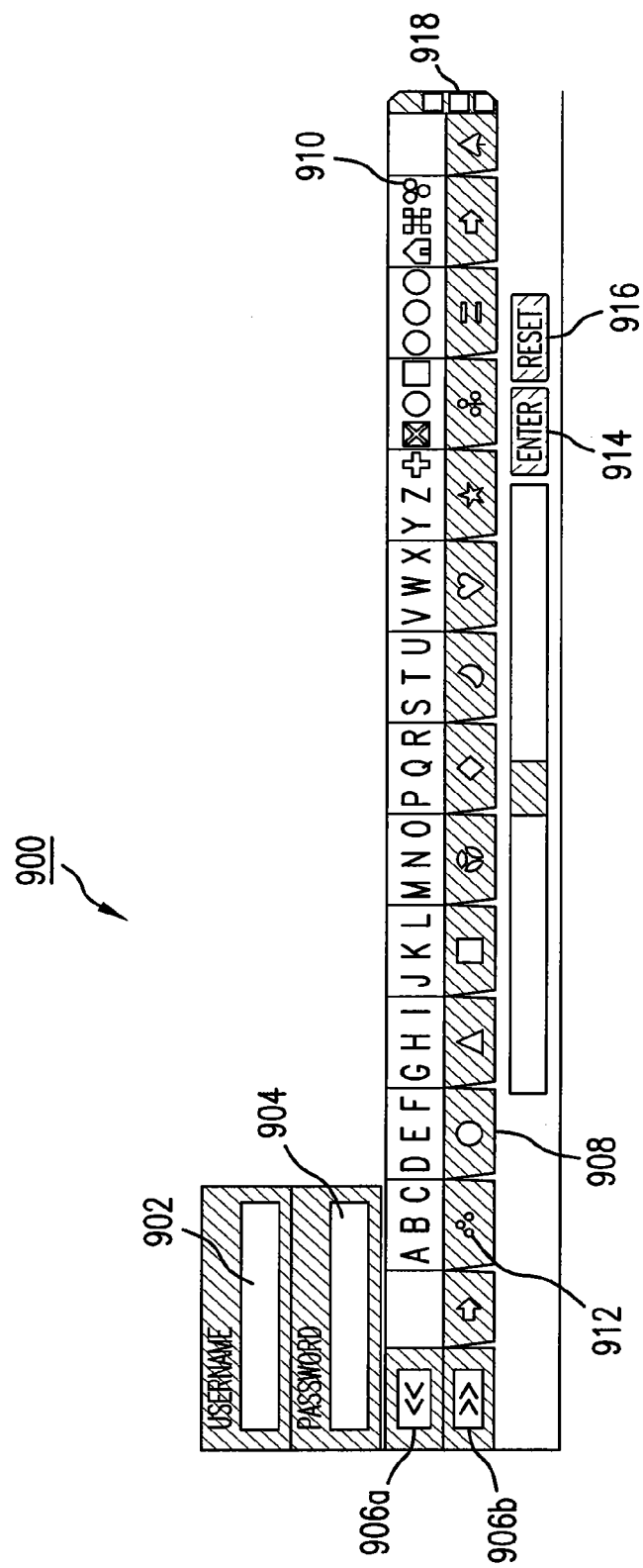
FIG. 9 illustrates a graphical slider-based authentication interface that may be used with embodiments of the present invention.

The GUIs illustrated in FIGS. 8 and 9 provide heightened security by enabling users to enter and submit passwords or other sensitive information using an online image that is unrecognizable in actual image form as well as in data output form. Further details of techniques for providing such "unrecognizable" online images are found in pending U.S. patent application Ser. No. 11/169,564, filed on Jun. 29, 2005, which is incorporated herein by reference in its entirety for all purposes. FIG. 8 illustrates a graphical wheel-based two-factor authentication interface for enabling authentication information entry using mouse click navigation for aligning alphanumeric and/or graphic symbols. FIG. 9 illustrates a graphical slider-based authentication interface for enabling authentication information entry using mouse click navigation for aligning alphanumeric and/or graphic symbols. It should be appreciated that the symbols and alphanumeric characters shown in FIGS. 8 and 9 are exemplary (i.e., other graphical symbols and images may be used to practice the invention).

The wheel GUI 800 of FIG. 8 can be generated or stored by Authenticator 700 and comprises at least two concentric wheels 802 and 804 for encryption at the point of data entry. In order to enter the next element (or symbol/character) of the username field 810 or password field 812, a user guides reference points on the inner wheel 802 (e.g., via navigational mouse clicks on "right arrow" button 806 for counter-clockwise rotation or on "left arrow" button 808 for clockwise rotation) to the desired element on outer wheel 804. Reference points are selected by and known only to the user, making the image un-interpretable and/or indiscernible to outsiders, including various espionage software and "over-the-shoulder" spies.

Each time the user clicks on the "next" button to enter an image symbol, data describing the displacement though which the inner wheel 802 has moved from its prior orientation is sent to the service provider server, preferably as degrees, or radians, or a similar measure of angles. In an embodiment, the "enter" button is used to designate that the element for the username field 810 or password field 812 is to be submitted. The button identifiers shown are exemplary only; other button identifiers may be used for the invention. In some embodiments, only one button is may be used instead of the "next" and "enter" buttons for systems wherein the username and/or password are of a fixed length. The elements entered in either the username field 810 or password field 812 can be visually hidden or masked as an aid in preventing an "over the shoulder" spy from viewing the field information. For example, an asterisk may optionally be displayed in the field to signify entry of each element.

Displacement of the inner wheel 802 (e.g., measured in degrees, radians, or similar measure of angles) is subsequently sent to, and decoded by, the service provider server. The Authenticator knows the real authentication information and the image details and therefore deduces the selected marker by decoding the displacement information in order to determine/decode the user inputs for authenticating the session. Displacement coordinates are session-specific and unusable once the session ends.

FIG. 9 illustrates a graphical slider-based authentication interface 900 according to an embodiment of the present invention. Slider 900, also referred to as a "ruler," includes a username entry field 902, password entry field 904, and selectable arrow buttons 906A and 906B for moving the slider. Alternatively, keyboard arrow keys may also be used for moving the slider. Slider 900 includes a lower row 908 have a sequence of symbols (or characters), i.e., having the trump symbol 912, i.e., "♠", below the letter "B" for this example, and a fixed upper row 910 having a sequence of elements (or characters) to be entered. The lower row 908 is slidingly displaceable in operation as a function of user navigational mouse clicks on the "left arrow" button 906A and "right arrow" button 906B. Displacement of the moveable lower row 908 of slider 900 is measured relative to the fixed upper sow 910 and sent to and decoded by the service provider server once the user signifies submission using the "enter" button 914. Thus, the general concept of transmission of displacement information to the Authenticator using slider 900 is similar to that for wheel 800.

A "reset" button 916 is preferably provided to enable a user to restart entry of the username or password. Block icons 918 are provided preferably on the right side of the two rows for displaying the status of the field entry (e.g., indicating how many elements of the user name or password have been entered). In an embodiment, the entered elements are not displayed in either the username field 802 or password field 904 as an aid in preventing an "over the shoulder" spy from viewing the field information. Alternatively, an asterisk can be shown in the entry input portions to signify entry of each element.

FIG. 2 illustrates a graphical user interface in the form of a known numeric keypad. The keypad image is preferably one of the selectable GUIs in database 704. FIGS. 10A-10E illustrate higher security level user interface modifications to the standard keypad interface that provide five additional selectable tiers that are more secure than the standard keypad interface. These interfaces can be stored by the Authenticator, or can be generated by the Authenticator (e.g., from the interface of FIG. 2).

Figure 10C:
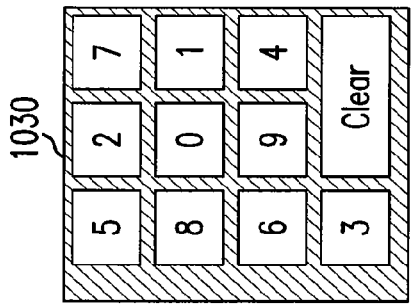
FIGS. 10A-10E illustrate a plurality of higher security keypad graphical authentication interfaces that may be used with embodiments of the present invention.
Figure 10B:
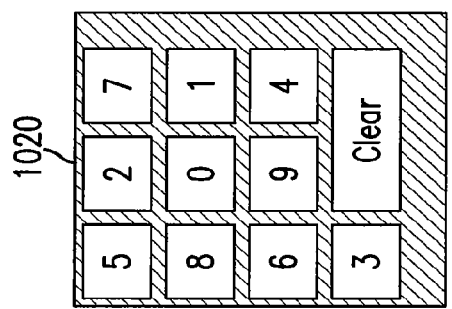
Figure 10A:
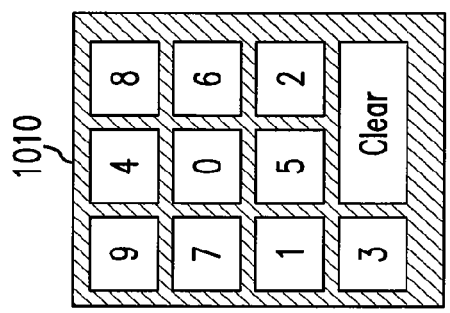

FIG. 10A illustrates a first selectable higher security keypad graphical authentication interface 1010 that reorders the alphanumeric symbols in keypad 20 of FIG. 2. This reordering provides additional security against mouse-click x-y coordinate loggers by having different x-y coordinates for the numbers on the keypad image.

FIG. 10B illustrates a second selectable higher security keypad graphical authentication interface 1020 that offsets the keypad 20 of FIG. 2 in one direction. The keypad interface 1020 provides additional security against mouse click and x-y coordinate loggers and screen capturers by offsetting the keypad. A drawback of the reordering in FIG. 10B is that a sophisticated screen capturer with optical character recognition (OCR) could decipher where, for instance, each number in the keypad is located in relative x-y coordinates and cross reference this to the x-y coordinates for the mouse clicks in order to ascertain the input numeric sequence.

FIG. 10C illustrates a third selectable higher security keypad graphical authentication interface 1030 that offsets the keypad 20 of FIG. 2 in another direction.

Figure 10E:
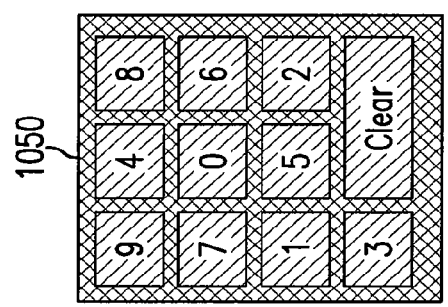
Figure 10D:
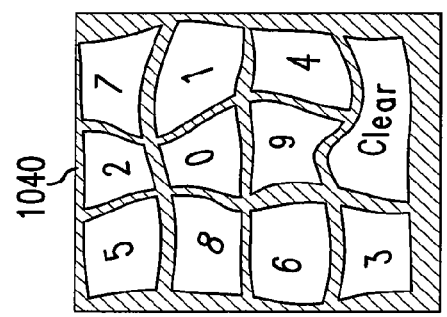

FIG. 10D illustrates a fourth selectable security keypad graphical authentication interface 1040 that distorts the alphanumeric keypad entry choices in keypad 20 of FIG. 2. The method of distorting a graphic user interface image is described in further detail in pending U.S. patent application Ser. No. 11/169,564, filed Jun. 29, 2005, which is incorporated herein by reference in its entirety for all purposes. Interface 1040 provides additional protection against screen capture/OCR and mouse click x-y loggers by distorting the image and the numeric characters. The distortion enables a human user to readily identity the number in the image, while preventing a screen capturer/OCR and x-y coordinate logger from linking mouse clicks to the specific number.

FIG. 10E illustrates a fifth selectable higher security keypad graphical authentication interface 1050 that reorders and shades of a potion of the interface of FIG. 2. The speckled shading in interface 1050 provides protection against spyware that relies on checksums on the graphic image in order to decrypt the x-y location of each number on the numeric keypad in order to steal the username or password. The specked shading changes the resultant checksum as compared to the image in FIG. 10A and, coupled with the reordering of the keypad numerals as in FIG. 10B, provides enhanced security.

Figure 3:
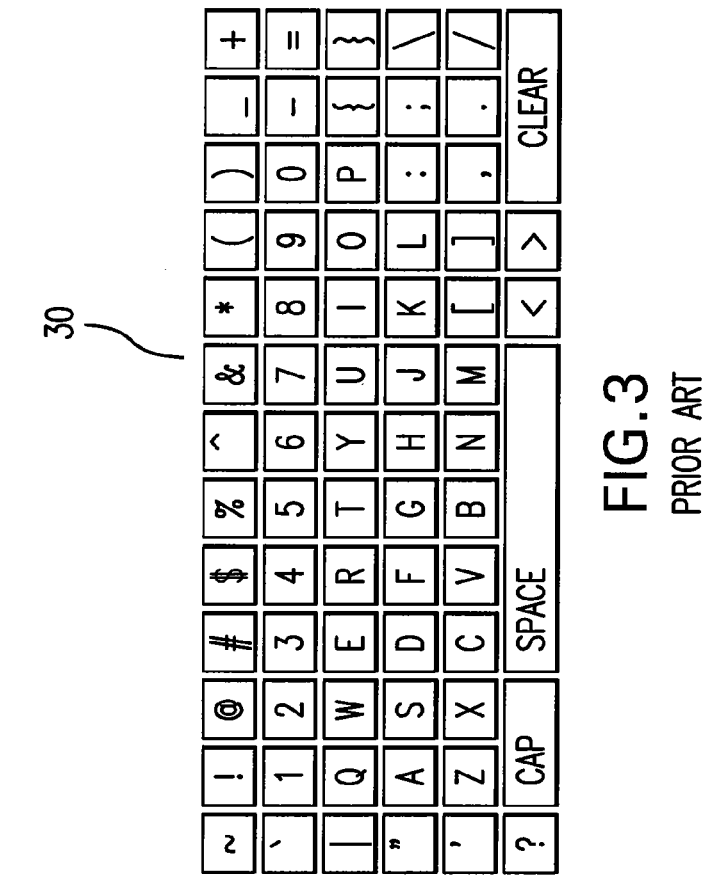
FIG. 3 illustrates a prior art keyboard graphical user interface for enabling entry of authentication information via mouse click selections.

It should be appreciated that the distortion methods of FIG. 10D, as well as the methods for the other modifications in FIGS. 10A-10E, can also be applied to the other graphical user interfaces (e.g., distorting a keyboard, such as keyboard 30 of FIG. 3, as described in the above-identified U.S. patent application). Conversely, embodiments of the present invention is not limited to the above-described distortion techniques, but includes other distortion techniques known in the art for enhancing security.

Device Central Repository (DCR) Services

Figure 11:
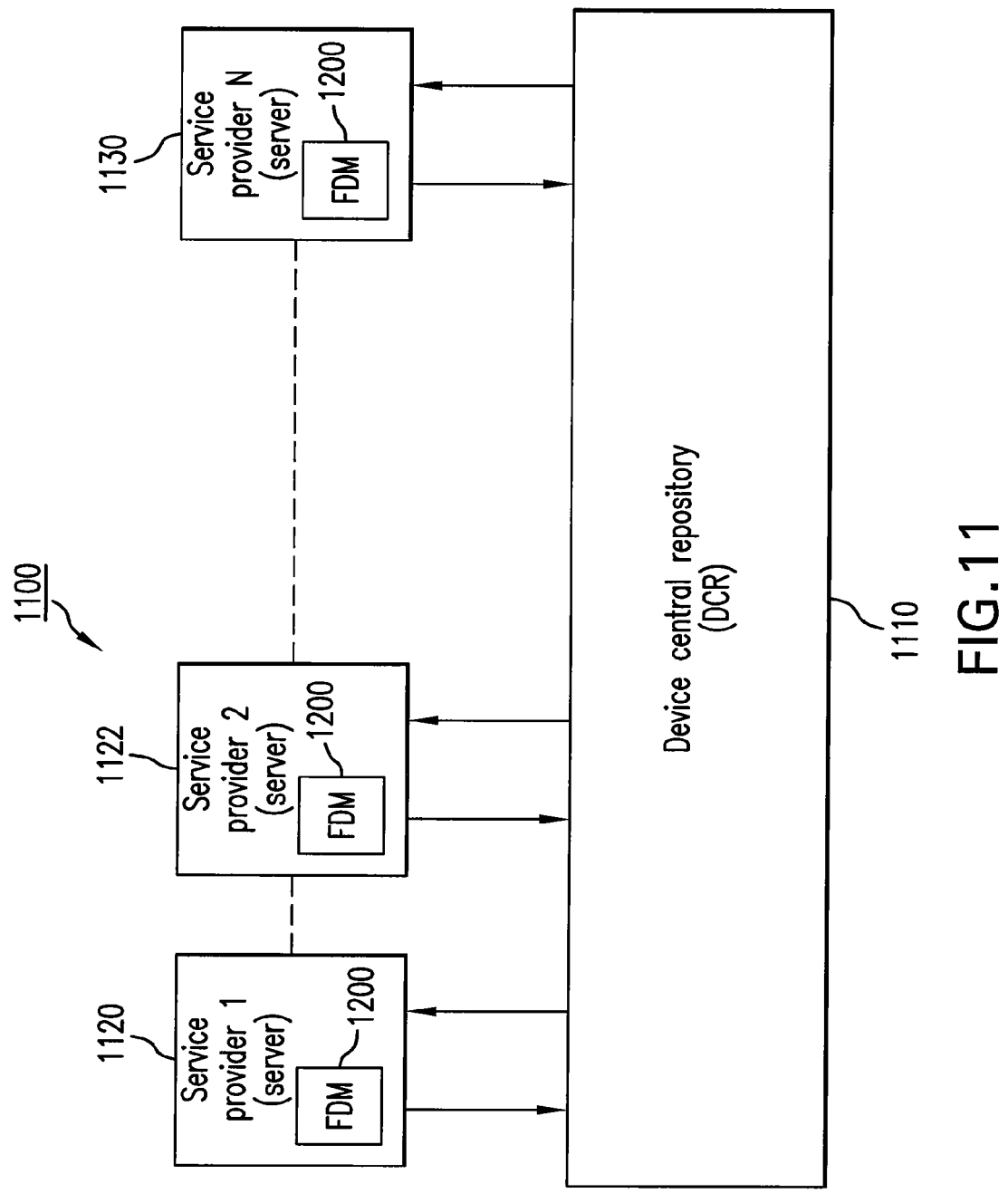
FIG. 11 is a simplified block diagram illustrating a Device Central Repository (DCR) in accordance with an embodiment of the present invention.

FIG. 11 is a simplified block diagram illustrating components of a Device Central Repository (DCR) 1100 for storing and reporting historical device risk information to and from a plurality of service providers (e.g., service providers 1 through N). The DCR system includes a DCR server application which is resident and executed on a DCR web server 1110 preferably separate from the web servers of the service providers. DCR web server 1110 is made accessible to one or more service-provider subscribers (illustrated as service providers 1 to N on web servers 1120, 1122-1130) by suitable public networks or private networks such as the public Internet, and provides predetermined fraud risk information based on the device identifying information gathered by the fingerprinting module of the present invention (when they are invoked by a service provider application). The service provider application communicates with the DCR server application by facilities provided by the flagged device module (FDM) 1200 executed at each service provider.

Figure 12:
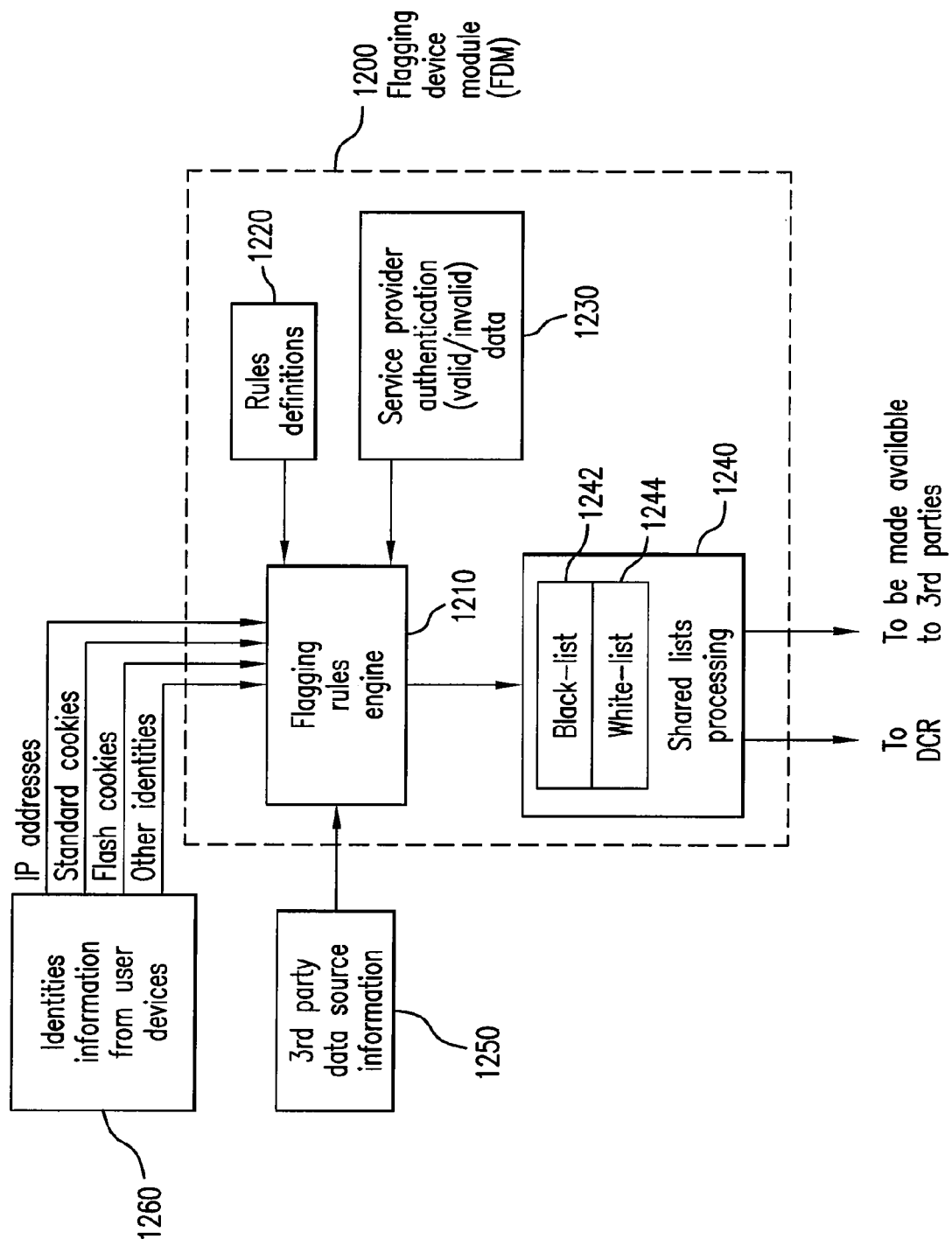
FIG. 12 is a simplified block diagram illustrating components of a Flagged Devices Module (FDM) in accordance with an embodiment of the present invention.

FIG. 12 is a simplified block diagram illustrating components of a Flagged Devices Module (FDM) 1200. FDM 1200 includes a flagging rules engine 1210, a rule definitions module 1220, a shared lists processing module 1240, and a service provider authentication (valid/invalid) data module 1230. Turning first to the flagging rules engine, its inputs include information produced by embodiments of the present invention, as well as information retrieved from external third party data providers. This input information includes service provider authentication information 1230, which describes the authentication results of a current user request, such as whether or not the current request is fraudulent.

The input information further includes device identifying information gathered from user devices 1260 by fingerprinting module 400. This device identifying information is similar to information 500 input to FAAS 600 and stored in database 610. In an embodiment, the device identifying information includes IP address, standard cookies, flash cookies, and/or other identifying information. Other known identifiers may also be used to identify user devices, and may depend on the level of security and information that has been accessible in the past from the user device.

The input information further includes data from third party data providers 1250. This data is generally similar to the content of the third party inputs to FAAS 600, and may include third party geolocation data 612, third party black list data 614, and third party white list data 616.

The combined input information, along with the current device identifying information, is transmitted to the DCR where it is used to update the historical risk database. The combined input information is also evaluated by flagging rules engine 1210, which applies rules definitions 1220 in order to maintain lists that identify devices and their associated fraud risk based on historical information and optionally targeted to one or more specific user devices. Guided by flagging rules engine 1210, shared lists processing 1240 creates, updates, and otherwise maintains a black list 1242 and a white list 1244. The lists are device based for identifying devices and the potential fraud risk posed by each device.

This information is made available to the FAAS (input 618 in FIG. 6). This information is also output to DCR server 1110 in FIG. 11. The DCR can then make available the shared lists (and, optionally, further risk information) via the network to subscribing service providers. Further, the lists can be published so that they are available for use by third party vendors.

Administrative Tools

Embodiments of the present invention further include administrative tools that assist system operators and service providers in providing fraud detection/authentication services.

One such administrative tool is a "dashboard." The dashboard has a graphical interface that allows customized views by users, devices, countries of origin, and provides an at-a-glance visibility into potential fraudulent activities in progress. The dashboard offers a real-time view of the health of the secured application. It contains a set of default monitors which can be combined in any fashion to track a specific set of activities. It can be tailored for each user to display only the monitors of interest. Monitors are the mechanisms used to aggregate real-time tracker information. Monitors can count everything from invalid users to login attempts from a specific country. A few of the default monitors include, for example: attempted logins by status; new devices; first time logins; alert count; and location count (for a specific location or location group). After the monitors have been defined, they can be used in the dashboard view by specifying a monitor and a chart type.

The alerts browser gives a detailed list of alerts triggered at authentication and transaction check points. It identifies which user/transaction is at risk for fraudulent behavior by delivering correlated impact analysis organized by users, devices, geographies and alerts. The present invention can also automatically notify appropriate personnel or even the end user about the alerts/transactions via e-mail, pager, by forwarding alarms to a network management system, or by invoking any user-specified action.

In one set of embodiments, a version of the dashboard is customized to display only specific alerts for trending purposes, instead of all possible alerts. For example, a service provider may want to only monitor all wire transfers with the red alert instead of all other transactions.

Further tools include customizable reports that provide detailed risk management and analysis information. Reports can provide historical information including geographic locations, devices, users. Most data accessed by the techniques described herein may be presented in one or more reports.

Another administrative tool provides case management that enables a service provider to review servicing logs for each individual client and to investigate the reasons actions were taken or alerts were triggered.

For example, service provider personnel can view the reason a login or transaction was blocked, view a severity flag with alert status to assist in escalation, complete actions such as issuing temporary allowance for a customer, or un-registering a device, if appropriate, and the like. The capabilities and viewership rights in the fraud analyzer component of the customer care tool can be customized and managed according to roles and company procedures.

Application Fingerprinting

As described above, embodiments of the present invention provide techniques for detecting whether a request (e.g., authentication request, transaction request, etc.) submitted by a user of a service provider application (e.g., online shopping application, online banking application, etc.) is likely to be fraudulent and/or malicious. In one set of embodiments, this detection is based on the data submitted by the user in the request. For example, assume a user U1 submits, via one or more input fields of the application, a data string DS1. In various embodiments, this data string is received and used to generate an "application fingerprint" that uniquely identifies that submitted data. In addition, the application fingerprint is associated with a context in which the string DS1 was submitted (e.g., a user context identifying user U1). Once the application fingerprint has been generated, it is compared with one or more historical application fingerprints identifying data that was previously submitted in the same, or substantially similar, context (e.g., by the same user U1). This comparison is then used to generate one or more actions, a risk alert, or risk score as discussed above. In this manner, embodiments of the present invention may be used to detect anomalous (e.g., malicious or fraudulent) data that is submitted to a service provider application, such as embedded SQL and the like. Such malicious and/or fraudulent data is not easily detectable by other fingerprinting processes such as device, location, or workflow fingerprinting.

The application fingerprinting techniques described herein may be applied in a variety of different domains and contexts. Certain embodiments are particularly useful for detecting fraudulent and/or malicious data submitted to web-based service provider applications, which are commonly the targets of hacking attacks such as SQL injection and the like. However, these techniques may be used to detect anomalous data submitted to any type of software application.

Figure 18:
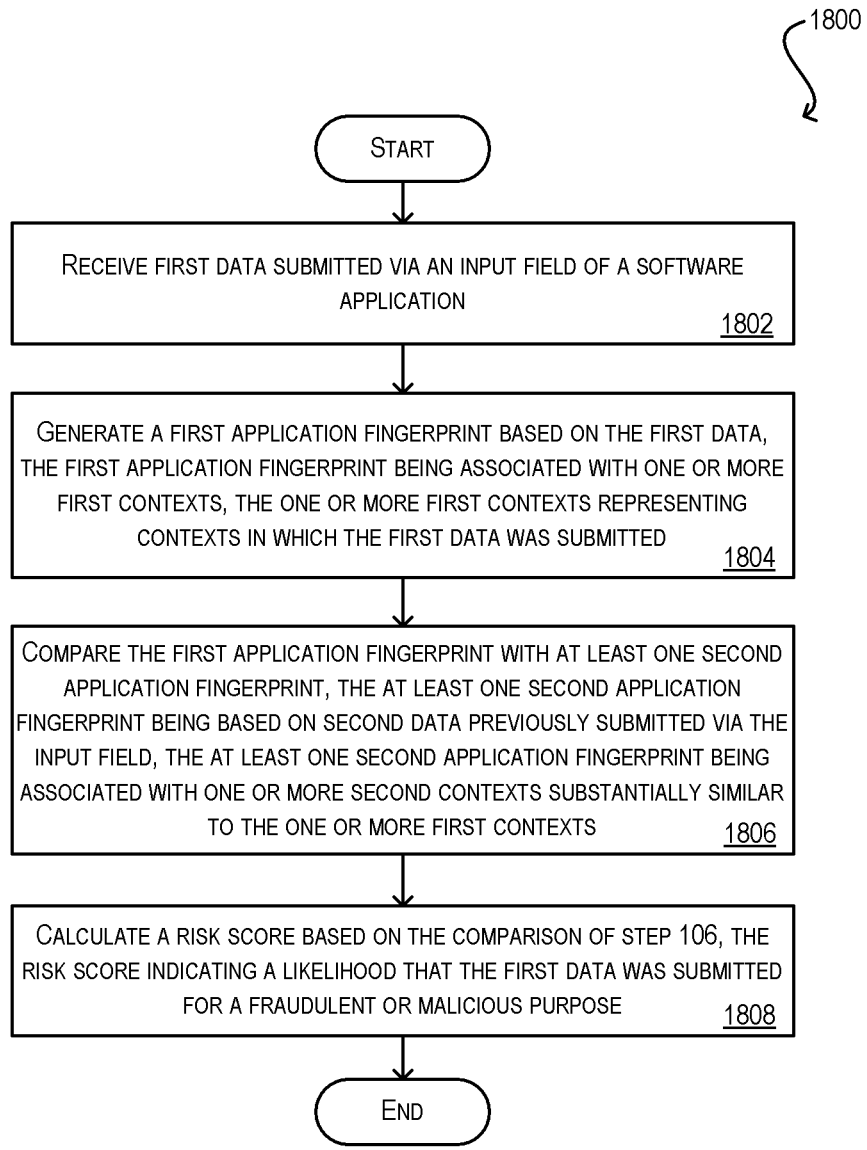
FIG. 18 is a flowchart illustrating steps performed in detecting anomalous data submitted to a software application in accordance with an embodiment of the present invention.

FIG. 18 is a flowchart 1800 illustrating the steps performed in detecting anomalous data submitted to a software application in accordance with an embodiment of the present invention. In various embodiments, the processing of flowchart 1800 may be implemented in software, hardware, or combinations thereof. As software, the processing of flowchart 1800 may be implemented in FAAS process 600 of FIG. 6. Alternatively, the processing of flowchart 1800 may be integrated into the software application (e.g., service provider application) being monitored/protected.

At steps 1802 and 1804, first data submitted via an input field of the software application is received, and a first application fingerprint is generated based on the first data. As described above, an application fingerprint is a signature that uniquely identifies a piece of user-submitted data. Thus, if the first data corresponds to a data string DS1, the first application fingerprint will be a signature that uniquely identifies the string DS1. In various embodiments, the first application fingerprint be in generated in a similar manner as the device fingerprints, location fingerprints, and workflow fingerprints described above. For instance, the first application fingerprint may be represented as a binary token, where the various bits in the binary token correspond to "bins," and where each bin corresponds to a characteristic of the submitted data (e.g., the first data). Those characteristics may include, for example, data size, data type, data content, and the like. The binary token representation can be optionally compressed using known techniques.

As shown in step 1804, the first application fingerprint is associated with one or more first contexts representing contexts in which the first data was submitted. These contexts serve to correlate the first application fingerprint with other, previously submitted application fingerprints. The one or more first contexts may include, for example, a user context identifying a user that submitted the first data, a device context identifying a device used to submit the first data, a location context identifying a location from which the first data was submitted, a workflow context identifying a workflow that was being performed when the first data was submitted, and/or the like.

In an embodiment, the one or more first contexts associated with the first application fingerprint are configurable. Accordingly, the one or more first contexts may include any number and combination of contexts (e.g., user context, device context, location context, workflow context, etc), deemed to be appropriate for a given security implementation. Thus, if the first data was submitted by a user U1 using a device D1 from a location L1, the first application fingerprint may be associated with a single context identifying, for example, user U1. In another embodiment, the first application fingerprint may be associated with two contexts identifying, for example, user U1 and device D1. In yet another embodiment, the first application fingerprint may be associated with three contexts identifying, for example, user U1, device D1, and location L1. One of ordinary skill in the art would recognize many variations, modifications, and alternatives.

Once the first application fingerprint has been generated, the first application fingerprint is compared with at least one second application fingerprint (step 1806). The second application fingerprint is based on second data previously submitted via the input field, and is associated with one or more second contexts substantially similar to the one or more first contexts. In other words, the second application fingerprint is a signature of historical data that was previously submitted to the application under the same or similar circumstances (e.g., by the same user, from the same device, from the same location, during the same workflow, etc.) as the first data. By comparing the two application fingerprints in this manner, embodiments of the present invention can, for example, determine whether the currently submitted data (i.e., the first data) is inconsistent with the historical data (i.e., the second data).

Based on the comparison performed at step 1806, a risk score is calculated that indicates a likelihood that the first data was submitted for a fraudulent or malicious purpose. In various embodiments, the risk score is calculated by rules engine 604 of FIG. 6 using one or more rules defined in one or more policies (e.g., the security policies, business policies, and/or workflow policies of FIG. 15A). According to one such policy, a degree of similarity may be determined between the first application fingerprint and the at least one second application fingerprint, and the risk score may be calculated based on the degree of similarity. For example, if the degree of similarity is low (indicating the first data is inconsistent with previously submitted second data), the risk score may be increased. Conversely, if the degree of similarity is high (indicating that the first data is substantially consistent with the previously submitted second data), the risk score may be decreased.

Accordingly to another policy, the risk score may be further based other factors/contexts that are distinct from the one or more first contexts associated with the first application fingerprint. For example, assume that the first application fingerprint is associated with a user context U1 and a device context D1. In this case, rules engine 604 will typically attempt to calculate a risk score based on comparisons of the first application fingerprint with various historical application fingerprints sharing the same user and device contexts. However, assume that rules engine 604 also has additional data regarding, for example, a location from which the first data was submitted (e.g., location L1). In this case, rules engine 604 can also use this location context information to refine the risk score. For example, if location L1 is unknown to the application (i.e., user U1 has never submitted data from location L1 before), the risk score may be increased. Alternatively, if location L1 is known to be a source of fraudulent or valid data submissions (via., for example, a location black list or a location white list), the risk score can be adjusted accordingly.

As described above, the rules/policies used by risk engine 604 in calculating a risk score may be defined by the service provider operating the software application, or tailored to the service provider's requirements.

Although not shown, once the a risk score has been generated, the first application fingerprint may be stored in a historical fingerprint database (e.g., DCR 1110 of FIG. 11). Thus, the first application fingerprint (and its associated risk score) may be used in evaluating future data submissions to the application. In an embodiment, the first application fingerprint may be stored only if its risk score falls below a predetermined threshold (thereby indicating that the submitted data is not malicious or fraudulent). In some embodiments, the first application fingerprint may be transmitted to flagging rules engine 1210 of FDM 1200, which applies rules definitions 1220 and adds the fingerprint to a black list or white list as appropriate.

It should be appreciated that the steps illustrated in FIG. 18 provide a particular method for detecting anomalous data submitted to a software application according to an embodiment of the present invention. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 19:
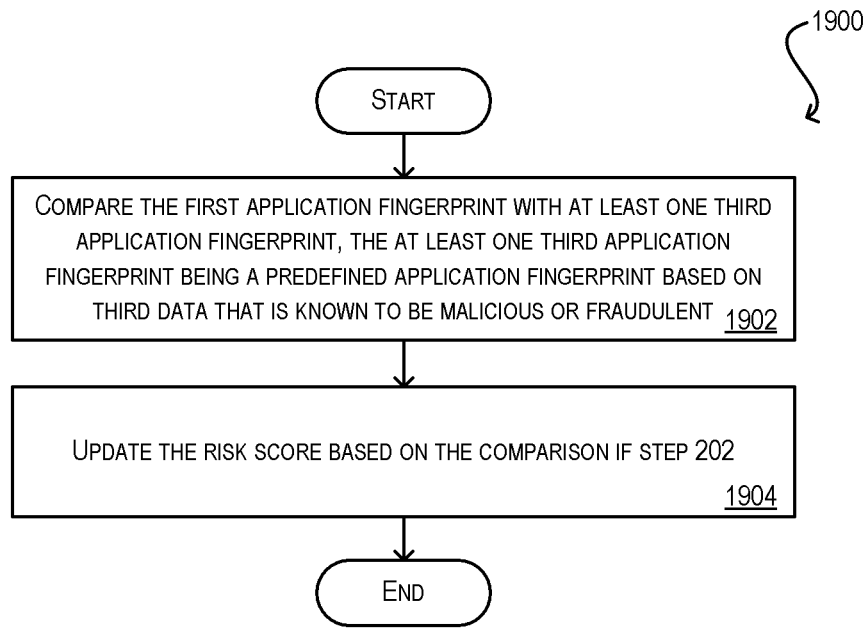
FIG. 19 is a flowchart illustrating additional steps performed n detecting anomalous data submitted to a software application in accordance with an embodiment of the present invention.

FIG. 19 is a flowchart 1900 illustrating additional steps that may be performed in detecting anomalous data submitted to a software application in accordance with an embodiment of the present invention. Specifically, flowchart 1900 describes a process of using predefined application fingerprints to further refine the risk score calculated at step 1808 of FIG. 18.

At step 1920, the first application fingerprint generated at step 1804 of FIG. 18 is compared with at least one third application fingerprint, where the third application fingerprint is a predefined application fingerprint based on third data that is known to be malicious or fraudulent. For example, the third application fingerprint may correspond to a signature of one or more SQL statements/commands that are commonly used in SQL injection attacks. The risk score is then updated based on the comparison between the first application fingerprint and the third application fingerprint. Thus, the first application fingerprint is evaluated not only against historical data, but also against a predefined set of data that is known to be malicious or fraudulent. This improves the overall effectiveness of the application/system in protecting against all types of data-driven attacks.

In some embodiments, the processing of flowchart 1900 may always be performed in conjunction with the processing of flowchart 1800. In other embodiments, the processing of flowchart 1900 may be conditionally performed based on one or more rules. For example, if the risk score calculated in step 1808 of FIG. 18 exceeds a specified threshold, the processing of flowchart 1900 may be initiated.

Figure 20:
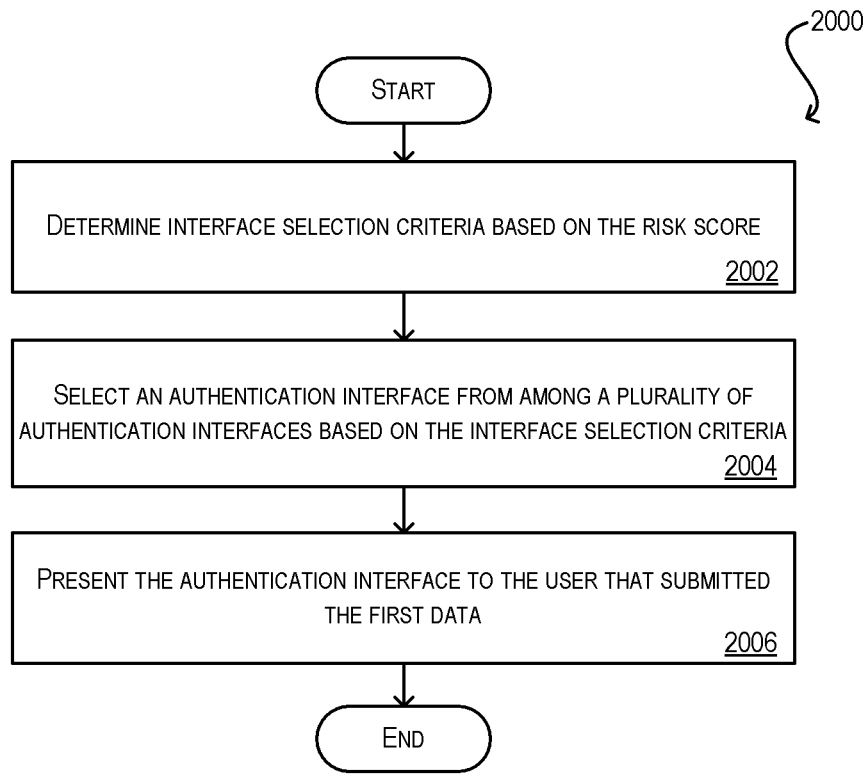
FIG. 20 is a flowchart illustrating steps performed in presenting an authentication interface to a user of a software application based on a calculated risk score in accordance with an embodiment of the present invention.

In one set of embodiments, the evaluation/comparison of application fingerprints described in flowcharts 1800 and 1900 may be used to generate one or more actions in addition to a risk score. For example, a risk alert may be generated for an administrator of the software application. Further, the user that submitted the data may be required to, for example, re-authenticate with the application. FIG. 20 is a flowchart 20 illustrating the steps performed in re-authenticating a user in accordance with an embodiment of the present invention.

At step 2002, interface selection criteria is determined based on the risk score calculated in step 1808 of FIG. 18. The interface selection criteria indicate the type of authentication interface that should be presented to the user for the purpose of re-authentication. For example, if the calculated risk score is high (indicating a high likelihood of fraud or malicious intent), the interface selection criteria may specific a higher security authentication interface. Conversely, if the calculated risk score is low (indicating a relatively low likelihood of fraud or malicious intent), the interface selection criteria may specify a lower security authentication interface.

At step 2004, the interface selection criteria is used to select a particular authentication interface from among a plurality of authentication interfaces. In an embodiment, this function is performed by interface selector/displayor 702 of Authenticator 700. Further, the authentication interface is selected from interface database 704.

Once selected, the authentication interface is presented to the user that submitted the first data (step 2006). Although not shown, authentication information may be received from the user in response to the presentation of the authentication interface, and the received authentication information may be used to further determine whether additional forms of authentication or verification are needed.

It should be appreciated that, in some cases, the risk score calculated at step 1808 of FIG. 1800 may so high (i.e., indicates such a high risk of fraud) that the service provider might not give the user an opportunity to re-authenticate with the application. In this type of situation, a fraud alert may be sent to the service provider operating the application, and the user's transaction/session may be terminated. The particular rules for this behavior may be defined by the service provider.

Although specific embodiments of the invention have been described, many variations of the present invention will become apparent to those skilled in the art upon review of the disclosure. Accordingly, the specification and drawings are to be regarded in an illustrative rather than a restrictive sense. The scope of the invention should be determined not with reference to the above description, but instead should be determined with reference to the pending claims along with their full scope or equivalents.

What is claimed is:

1. A method for detecting anomalous data submitted to a software application, the method comprising:
   receiving, at one or more computer systems, first data submitted by at least one user of the software application via an input field of the software application;
   packaging, with one or more processors associated with the one or more computer systems, at least a portion of the first data submitted by the at least one user of the software application to generate a first application fingerprint that uniquely identifies submission of the first data, the first application fingerprint associated with one or more first contexts, wherein the one or more first contexts represent contexts in which the first data was submitted by the at least one user of the software application, an association between the first application fingerprint and the one or more contexts directly identifying in the first application fingerprint either the at least one user or one or more devices of the at least one user used to submit the first data;
   comparing, with the one or more processors associated with the one or more computer systems, the first application fingerprint with at least one second application fingerprint, wherein the at least one second application fingerprint is generated based on packaging at least a portion of second data previously submitted by an authorized user of the software application via the input field, and wherein the at least one second application fingerprint is associated with one or more second contexts substantially similar to the one or more first contexts in which the first data was submitted by the at least one user of the software application, the association between the one or more second application fingerprints directly identifying in the second application fingerprint the authorized user or one or more devices of the authorized user used to submit the second data; and
   calculating, with the one or more processors associated with the one or more computer systems, a risk score based on the comparison of the first application fingerprint with the at least one second application fingerprint, the risk score indicating a likelihood that the first data was submitted for a fraudulent or malicious purpose.

2. The method of claim 1, wherein the first application fingerprint is based on one or more of: data size of the first data, data type of the first data, and data content of the first data.

3. The method of claim 1, wherein the one or more first contexts associated with the first application fingerprint are configurable.

4. The method of claim 1, wherein the one or more first contexts include one or more of: a user context identifying a user that submitted the first data, a device context identifying a device used to submit the first data, a location context identifying a location from which the first data was submitted, and a workflow context identifying a workflow of the software application that was being performed when the first data was submitted.

5. The method of claim 1, wherein the step of calculating the risk score is further based on one or more third contexts representing contexts in which the first data was submitted, wherein the one or more third contexts are distinct from the one or more first contexts.

6. The method of claim 5, wherein the one or more third contexts include one or more of: a user context identifying a user that submitted the first data, a device context identifying a device used to submit the first data, a location context identifying a location from which the first data was submitted, and a workflow context identifying a workflow of the software application that was being performed when the first data was submitted.

7. The method of claim 6, wherein the one or more third contexts include the device context, and wherein the risk score is increased if the device context identifies a device that is unknown or on a device black list.

8. The method of claim 6, wherein the one or more third contexts include the location context, and wherein the risk score is increased if the location context identifies a location that is unknown or on a location black list.

9. The method of claim 1, wherein calculating the risk score based on the comparison of the first application fingerprint with the at least one second application fingerprint comprises:
   calculating a degree of similarity between the first application fingerprint and the at least one second application fingerprint; and
   calculating the risk score based on the degree of similarity.

10. The method of claim 1 further comprising:
    comparing the first application fingerprint with at least one third application fingerprint, wherein the at least one third application fingerprint is a predefined application fingerprint based on third data that is known to be malicious or fraudulent; and
    updating the risk score based on the comparison of the first application fingerprint with the at least one third application fingerprint.

11. The method of claim 10, wherein the third data comprises one or more SQL commands.

12. The method of claim 1 further comprising:
    if the risk score exceeds a predefined threshold, presenting an authentication interface to the user that submitted the first data.

13. The method of claim 12, wherein presenting the authentication interface comprises:
    determining interface selection criteria based on the risk score; and
    selecting the authentication interface from among a plurality of authentication interfaces based on the interface selection criteria.

14. The method of claim 1 further comprising:
    if the risk score exceeds a predefined threshold, generating an alert for an administrator of the software application.

15. The method of claim 1, wherein the steps of receiving, generating, comparing, and calculating are performed during runtime of the software application.

16. The method of claim 1, wherein the software application is a Web-based application.

17. A system for detecting anomalous data submitted to a software application, the system comprising:
    a storage component configured to store a plurality of historical fingerprints, each historical fingerprint generated based on packaging at least a portion of data submitted to the software application by one or more users of the software application via an input field of the software application; and
    a processing component communicatively coupled with the storage component, the processing component being configured to:
    receive first data submitted by at least one user of the software application via the input field;
    package at least a portion of the first data submitted by the at least one user of the software application to generate a first application fingerprint that uniquely identifies submission of the first data, the first application fingerprint associated with one or more first contexts, wherein the one or more first contexts represent contexts in which the first data was submitted by the at least one user of the software application, an association between the first application fingerprint and the one or more contexts directly identifying in the first application fingerprint either the at least one user or one or more devices of the at least one user used to submit the first data;

compare the first application fingerprint with at least one historical fingerprint in the plurality of historical fingerprints, wherein the at least one historical fingerprint is associated with one or more second contexts substantially similar to the one or more first contexts in which the first data was submitted by an authorized user of the software application via the input field, the association between the at least one historical application fingerprints directly identifying in the historical application fingerprint the authorized user or one or more devices of the authorized user used to submit the data from which the at least one historical application fingerprint was generated; and calculate a risk score based on the comparison of the first application fingerprint with the at least one historical fingerprint, the risk score indicating a likelihood that the first data was submitted for a fraudulent or malicious purpose.

18. The system of claim 17, wherein the processing component is not configured to run the software application.

19. The system of claim 17, wherein the storage component is further configured to store one or more access policies, each access policy comprising rules for calculating the risk score.

20. The system of claim 19, wherein the one or more access policies are defined by a service provider of the software application.

21. A non-transitory machine-readable medium for a computer system, the machine-readable medium having stored thereon a series of instructions which, when executed by a processing component of the computer system, cause the processing component to detect anomalous data submitted to a software application by:

receiving first data submitted by at least one user of the software application via an input field of the software application;

packaging, with one or more processors associated with the one or more computer systems, at least a portion of the first data submitted by the at least one user of the software application to generate a first application fingerprint that uniquely identifies submission of the first data, the first application fingerprint with one or more first contexts, wherein the one or more first contexts represent contexts in which the first data was submitted by the at least one user of the software application, an association between the first application fingerprint and the one or more contexts directly identifying in the first application fingerprint either the at least one user or one or more devices of the at least one user used to submit the first data;

comparing the first application fingerprint with at least one second application fingerprint, wherein the at least one second application fingerprint is generated based on packaging at least a portion of second data previously submitted by an authorized user of the software application via the input field, and wherein the at least one second application fingerprint is associated with one or more second contexts substantially similar to the one or more first contexts in which the first data was submitted by the at least one user of the software application, the association between the one or more second application fingerprints directly identifying in the second application fingerprint the authorized user or one or more devices of the authorized user used to submit the second data; and calculating a risk score based on the comparison of the first application fingerprint with the at least one second application fingerprint, the risk score indicating a likelihood that the first data was submitted for a fraudulent or malicious purpose.

* * * * *

UNITED STATES PATENT AND TRADEMARK OFFICE
CERTIFICATE OF CORRECTION

PATENT NO. : 8,739,278 B2
APPLICATION NO. : 12/260544
DATED : May 27, 2014
INVENTOR(S) : Varghese It is certified that error appears in the above-identified patent and that said Letters Patent is hereby corrected as shown below:

In the Drawings

On sheet 5 of 23, in figure 5, under Reference Numeral 506, line 2, delete "Per-determined" and insert -- Pre-determined --, therefor.

On sheet 5 of 23, in figure 5, under Reference Numeral 514, line 3, delete "authenthication" and insert -- authentication --, therefor.

On sheet 13 of 23, in figure 13A, under Reference Numeral 1306, line 1, delete "Authencation" and insert -- Authentication --, therefor.

On sheet 15 of 23, in figure 14, line 1, delete "Authencation" and insert -- Authentication --, therefor.

On sheet 15 of 23, in figure 14, line 14, delete "Trencing" and insert -- Trending --, therefor.

On sheet 17 of 23, in figure 15B, line 3, delete "specifed" and insert -- specified --, therefor.

In the Specification

In column 6, line 21, delete "n" and insert -- in --, therefor.

In column 8 (Table 1), line 43, delete "ProcessRulesRespon" and insert -- ProcessRulesResponse --, therefor.

In column 9, line 61, delete "on" and insert -- or --, therefor.

In column 27, line 48, delete "nor" and insert -- not --, therefor.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,739,278 B2

In column 29, line 9, delete "1A-10E" and insert -- 10A-10E --, therefor.

In column 31, line 14, delete "identity" and insert -- identify --, therefor.

In column 31, line 19, delete "potion" and insert -- portion --, therefor.

In column 35, line 33, delete "the a" and insert -- the --, therefor.